(12) United States Patent
Skinner

(10) Patent No.: US 10,118,436 B2
(45) Date of Patent: Nov. 6, 2018

(54) PIXEL ART CRAYON AND MARKER PHOTO ARRAY ASSEMBLY AND KIT

(71) Applicant: CRAYOLA, LLC, Easton, PA (US)

(72) Inventor: Craig Skinner, Easton, PA (US)

(73) Assignee: Crayola, LLC, Easton, PA (US)

( * ) Notice: Subject to any disclaimer, the term of this patent is extended or adjusted under 35 U.S.C. 154(b) by 239 days.

(21) Appl. No.: 15/006,116

(22) Filed: Jan. 25, 2016

(65) Prior Publication Data

US 2017/0190208 A1 Jul. 6, 2017

Related U.S. Application Data

(60) Provisional application No. 62/262,775, filed on Dec. 3, 2015, provisional application No. 62/108,026, filed on Jan. 26, 2015.

(51) Int. Cl.
| | |
|---|---|
| *G09B 19/00* | (2006.01) |
| *B44B 9/00* | (2006.01) |
| *B44C 1/28* | (2006.01) |
| *B44C 3/12* | (2006.01) |
| *G06T 11/60* | (2006.01) |

(52) U.S. Cl.
CPC ............... *B44B 9/00* (2013.01); *B44C 1/28* (2013.01); *B44C 3/12* (2013.01); *G06T 11/60* (2013.01)

(58) Field of Classification Search
USPC ......... 434/81, 83, 84, 87, 88, 90, 96, 97, 98
See application file for complete search history.

(56) References Cited

U.S. PATENT DOCUMENTS

| | | | |
|---|---|---|---|
| 4,416,632 A | 11/1983 | Berman | |
| 5,257,097 A | 10/1993 | Pineau et al. | |
| 5,327,257 A | 7/1994 | Hrytzak | |
| 5,345,320 A | 9/1994 | Hirota | |
| 5,444,461 A | 8/1995 | Oz et al. | |
| 5,555,103 A | 9/1996 | Anderson | |
| 5,652,031 A * | 7/1997 | Commanda | B44C 3/12 428/13 |
| 5,694,228 A | 12/1997 | Peairs et al. | |

(Continued)

FOREIGN PATENT DOCUMENTS

| | | |
|---|---|---|
| DE | 4441860 C1 | 12/1995 |
| EP | 0188800 B1 | 5/1991 |

(Continued)

OTHER PUBLICATIONS

International Search Report and Written Opinion dated Apr. 8, 2016 in PCT Patent Application No. PCT/US16/14938, 7 pages.

(Continued)

*Primary Examiner* — Kurt Fernstrom
(74) *Attorney, Agent, or Firm* — Shook Hardy & Bacon, LLP

(57) ABSTRACT

Embodiments of the invention are directed to an apparatus and method for creating pixelated artwork composed of coloring element pixels. In some embodiments, a system converts the millions of pixels and colors of a digital image to a simplified color template with numbers assigned to particular colors. In one embodiment, a plastic grid is configured to cover the color template and receives crayons whose arrangement is determined by the numbers/colors of the color template.

19 Claims, 22 Drawing Sheets
(8 of 22 Drawing Sheet(s) Filed in Color)

(56) References Cited

U.S. PATENT DOCUMENTS

| | | | |
|---|---|---|---|
| 5,704,789 A * | 1/1998 | Yang .................. B44C 3/123 | |
| | | | 221/185 |
| 5,793,379 A | 8/1998 | Lapidous | |
| 5,913,992 A | 6/1999 | Gerber et al. | |
| 5,960,161 A | 9/1999 | Bloomberg et al. | |
| 5,971,762 A * | 10/1999 | McKenna .............. G09B 11/00 | |
| | | | 40/406 |
| 5,989,033 A * | 11/1999 | Burgio .................. G09B 11/06 | |
| | | | 434/217 |
| 6,003,577 A | 12/1999 | Morito et al. | |
| 6,026,196 A | 2/2000 | Shannon et al. | |
| 6,128,027 A | 10/2000 | DeBoer et al. | |
| 6,168,438 B1 * | 1/2001 | Leonard ................ G09B 11/06 | |
| | | | 434/81 |
| 6,252,577 B1 | 6/2001 | Rashkovskiy et al. | |
| 6,252,996 B1 | 6/2001 | Putnam | |
| 6,312,101 B1 | 11/2001 | Couwenhoven et al. | |
| 6,411,730 B1 | 6/2002 | Bartell et al. | |
| 6,590,574 B1 | 7/2003 | Andrews | |
| 6,591,010 B1 | 7/2003 | Russin | |
| 6,727,906 B2 | 4/2004 | Lockeridge et al. | |
| 6,729,932 B2 | 5/2004 | Jarvis | |
| 6,778,295 B1 | 8/2004 | Babulski | |
| 6,791,716 B1 | 9/2004 | Buhr et al. | |
| 6,856,704 B1 | 2/2005 | Gallagher | |
| 6,906,826 B1 | 6/2005 | Kuwata | |
| 6,985,621 B2 | 1/2006 | Bremsteller | |
| 7,085,006 B2 | 8/2006 | Yokoyama et al. | |
| 7,095,530 B2 | 8/2006 | Mantell et al. | |
| 7,136,189 B2 | 11/2006 | Sharma et al. | |
| 7,159,787 B2 | 1/2007 | Fukushima | |
| 7,205,995 B1 * | 4/2007 | Hod ..................... G09B 11/10 | |
| | | | 345/581 |
| 7,242,799 B1 | 7/2007 | Bremsteller | |
| 7,444,027 B2 | 10/2008 | Anderson | |
| 7,486,413 B2 | 2/2009 | Eliav et al. | |
| 7,502,150 B2 | 3/2009 | Gotoh et al. | |
| 7,554,540 B2 | 6/2009 | Hayes | |
| 7,654,023 B2 * | 2/2010 | Peters .................... G09F 9/305 | |
| | | | 40/547 |
| 7,715,050 B2 | 5/2010 | Topfer et al. | |
| 7,916,940 B2 | 3/2011 | Hel-Or | |
| 7,938,928 B2 | 5/2011 | Torres Candela | |
| 8,150,151 B2 | 4/2012 | Gori et al. | |
| 8,233,740 B2 | 7/2012 | Roth | |
| 8,260,080 B1 | 9/2012 | Wilensky | |
| 8,374,424 B2 | 2/2013 | Dietz | |
| 8,379,047 B1 | 2/2013 | DiVerdi | |
| 8,463,035 B2 | 6/2013 | Bechtel et al. | |
| 8,494,303 B2 | 7/2013 | Watanabe et al. | |
| 8,625,892 B2 | 1/2014 | Nakamura | |
| 8,830,242 B2 | 9/2014 | DiVerdi et al. | |
| 8,922,548 B2 | 12/2014 | Randall et al. | |
| 9,320,330 B2 * | 4/2016 | Cooke ....................... A63F 9/06 | |
| 2002/0154143 A1 | 10/2002 | Maier | |
| 2005/0063014 A1 | 3/2005 | Shinotsuka | |
| 2005/0281480 A1 | 12/2005 | Baldwin | |
| 2006/0077210 A1 | 4/2006 | Morris et al. | |
| 2007/0250197 A1 | 10/2007 | Glass et al. | |
| 2008/0018750 A1 | 1/2008 | Oh | |
| 2008/0089577 A1 | 4/2008 | Wang | |
| 2009/0243893 A1 | 10/2009 | Filliatre et al. | |
| 2010/0177353 A1 | 7/2010 | Fischer et al. | |
| 2010/0178448 A1 | 7/2010 | Nakajima | |
| 2010/0194780 A1 | 8/2010 | Acworth | |
| 2011/0276643 A1 | 11/2011 | Fischman et al. | |
| 2013/0065201 A1 | 3/2013 | Pool et al. | |
| 2013/0189650 A1 | 7/2013 | Lee et al. | |
| 2014/0120501 A1 | 5/2014 | Cooke et al. | |

FOREIGN PATENT DOCUMENTS

| | | |
|---|---|---|
| EP | 0713788 B1 | 12/1999 |
| EP | 1540733 B1 | 7/2008 |
| EP | 1711352 B1 | 11/2012 |
| FR | 2676300 A1 | 11/1992 |
| FR | 2733940 A1 | 11/1996 |
| GB | 1390977 A | 4/1975 |
| GB | 2127753 A | 4/1984 |
| JP | 2003315984 A | 11/2003 |
| WO | 2005006641 A1 | 1/2005 |
| WO | 2005075216 A1 | 8/2005 |

OTHER PUBLICATIONS

Plastic Dartboard for Crayone (online). thriftyfun, Aug. 31, 2011 (Aug. 31, 2011) [retrieved Mar. 11, 2016 (Mar. 11, 2016)]. Retrieved from the Internet: http://www.thriftyfun.comnfl 9640871.tip.html.

The Amazing Crayon Art of Christian Faur (online). AmusingPlanet, Nov. 17, 2009 (Nov. 17, 2009) [retrieved Mar. 10, 2016 (Mar. 10, 2016)]. Retrieved from the Internet: http://www.amusingplanet.com/2009/11/amazing-crayon-art-of-christian-faur.htm.

International Preliminary Report on Patentability dated Aug. 10, 2017 in International Patent Application No. PCT/US2016/014938, 6 pages.

\* cited by examiner

PIXEL ART CRAYON AND MARKER PHOTO ARRAY ASSEMBLY AND KIT

CROSS-REFERENCE TO RELATED APPLICATION

This application is a nonprovisional of and claims priority to U.S. Provisional Patent Application No. 62/108,026, entitled "Pixel Art Crayon Photo Array," filed Jan. 26, 2015, and U.S. Provisional Patent Application No. 62/262,775, entitled "Pixel Art Crayon Photo Array," filed Dec. 3, 2015, the entire contents of both of which is hereby incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief and at a high level, this disclosure describes, among other things, an apparatus, kit, and method for creating pixelated artwork comprised of colored "pixels," such as a pixelated image assembled from crayons, crayon segments, markers, marker end plugs, marker caps, ink, ink portions, and the like. In some aspects, a pixel art crayon and/or marker photo array assembly or kit may refer to a frame structure configured to secure multiple crayons, portions of crayons, markers, and/or marker end plugs in a specific configuration and according to a specific pixel-assigned layout associated with a user image, such as a user's photo having various colors that are assigned specific pixel colors corresponding to a particular coloring element (i.e., a crayon, a marker end plug, an ink color, etc.). The apparatus may further include a display structure, such as a framed box, that acts as an enclosure and/or frame, and a pixelated image template corresponding to a user-submitted image. In further aspects, a grid structure may be provided, such as a transparent plastic grid having a number of circular openings configured to receive crayons, and an assortment of crayons having colors corresponding to the pixel-assigned template, according to one embodiment of the invention.

Embodiments of a method to create a pixel art crayon photo array include the following steps: 1) the user uploads a photo to a server, 2) software on the server converts the photo to a pixelated image template and assigns numbers corresponding to specific regions of color on the original photo to the appropriate regions on the pixelated template, 3) each number is assigned to a particular crayon color, 4) the user downloads the pixelated template from the server, prints the template, and places the template in the bottom of a framed box, 5) the transparent plastic grid is placed over the template, and 6) crayons corresponding to the various numbers on the template are placed in the holes of the grid forming the pixels of the artwork.

Embodiments of the invention also include providing a kit that includes the framed box and transparent plastic grid and directions to upload/download images to/from the server along with directions on how to obtain the correct number and colors of crayons. Other embodiments include providing modular frames and crayon-holding grids to allow the user to assemble a frame and grid of a size of their choice. One method of assembling the modular frame and crayon-holding array is via snap/fit construction. In further embodiments, a grid structure for securing additional coloring elements is provided, such as a structure for assembling marker end plugs in an orientation corresponding to a pixel-assigned user image. In yet another embodiment, a pixel-assigned user image may provide a template background for a substrate configured to receive application of ink having specific colors corresponding to the template image.

DESCRIPTION OF THE DRAWINGS

The patent or application file contains at least one drawing executed in color. Copies of this patent or patent application publication with color drawing(s) will be provided by the Office upon request and payment of the necessary fee. Illustrative embodiments of the invention are described in detail below with reference to the attached drawing figures, and wherein.

DETAILED DESCRIPTION

Figure 1:
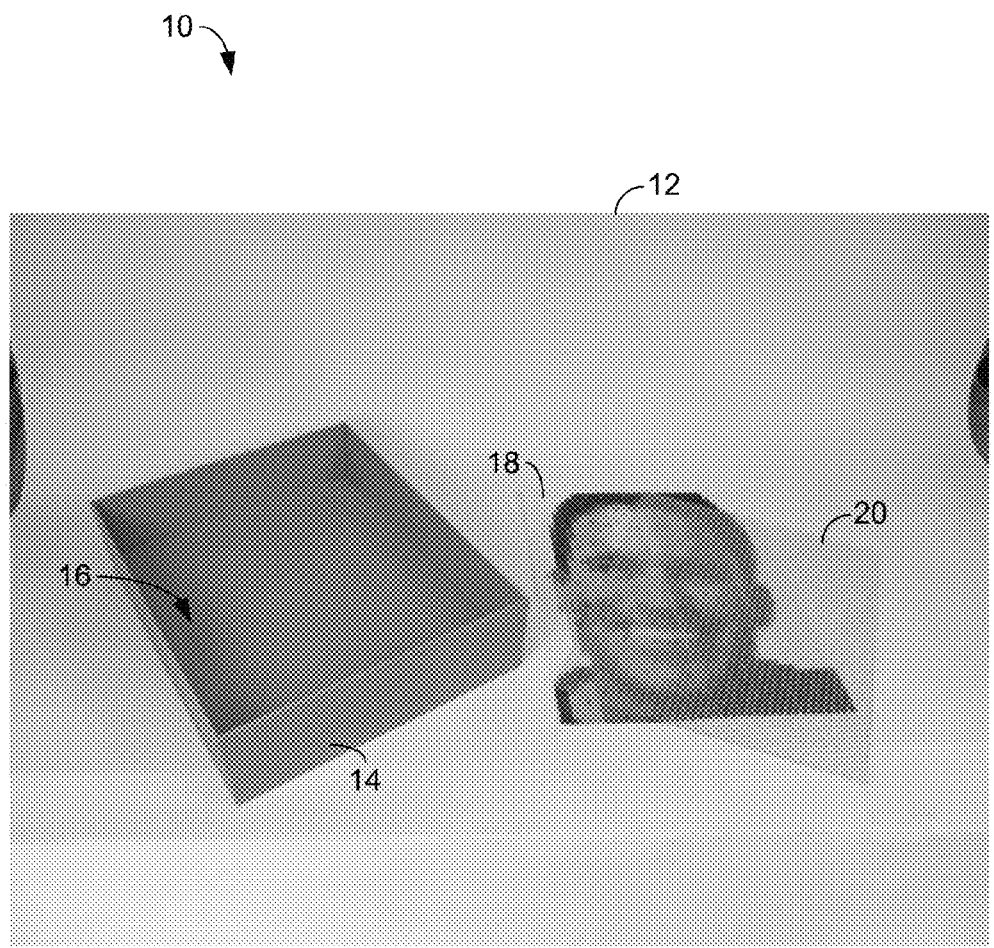
FIG. 1 illustrates a top perspective view of an unassembled pixel art crayon photo array, in accordance with an embodiment of the present invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention include, among other things, an apparatus, kit, and method for creating pixelated artwork comprised of colored "pixels," such as a pixelated image assembled from crayons, crayon segments, markers, marker end plugs, marker caps, ink, ink portions, and the like. In some aspects, a pixel art crayon and/or marker photo array assembly or kit may refer to a frame structure configured to secure multiple crayons, portions of crayons, markers, and/or marker end plugs in a specific configuration and according to a specific pixel-assigned layout associated with a user image, such as a user's photo having various colors that are assigned specific pixel colors corresponding to a particular coloring element (i.e., a crayon, a marker end plug, an ink color, etc.). The apparatus may further include a display structure, such as a framed box, that acts as an enclosure and/or frame, and a pixelated image template corresponding to a user-submitted image. In further aspects, a grid structure may be provided, such as a transparent plastic grid having a number of circular openings configured to receive crayons, and an assortment of crayons having colors corresponding to the pixel-assigned template, according to one embodiment of the invention.

Embodiments of a method to create a pixel art crayon photo array include the following steps: 1) the user uploads a photo to a server, 2) software on the server converts the photo to a pixelated image template and assigns numbers corresponding to specific regions of color on the original photo to the appropriate regions on the pixelated template, 3) each number is assigned to a particular crayon color, 4) the user downloads the pixelated template from the server, prints the template, and places the template in the bottom of a framed box, 5) the transparent plastic grid is placed over the template, and 6) crayons corresponding to the various numbers on the template are placed in the holes of the grid forming the pixels of the artwork.

Embodiments of the invention also include providing a kit that includes the framed box and transparent plastic grid and directions to upload/download images to/from the server along with directions on how to obtain the correct number and colors of crayons. Other embodiments include providing modular frames and crayon-holding grids to allow the user to assemble a frame and grid of a size of their choice. One method of assembling the modular frame and crayon-holding array is via snap/fit construction. In further embodiments, a grid structure for securing additional coloring elements is provided, such as a structure for assembling marker end plugs in an orientation corresponding to a pixel-assigned user image. In yet another embodiment, a pixel-assigned user image may provide a template background for a substrate configured to receive application of ink having specific colors corresponding to the template image.

Accordingly, a device 10 for generating a pixel art crayon photo array of a user-supplied digital image may include using crayons as the pixel components, as shown in the exemplary embodiments of FIGS. 1-8. In one embodiment, a kit 12 including a shallow box or frame 14, either pre-assembled or requiring assembly of one or more pieces by a user, and a transparent plastic grid 20 designed to fit inside the frame 14, may be provided. As such, the device 10 may include one or more components for generating a pixel art crayon photo array, such as a frame 14 having an interior cavity 16, a pixelated image template 18 with numbers assigned to areas of related colors within the array image, and a plastic grid 20 with holes designed to accept and secure crayons in an array orientation.

Figure 4:
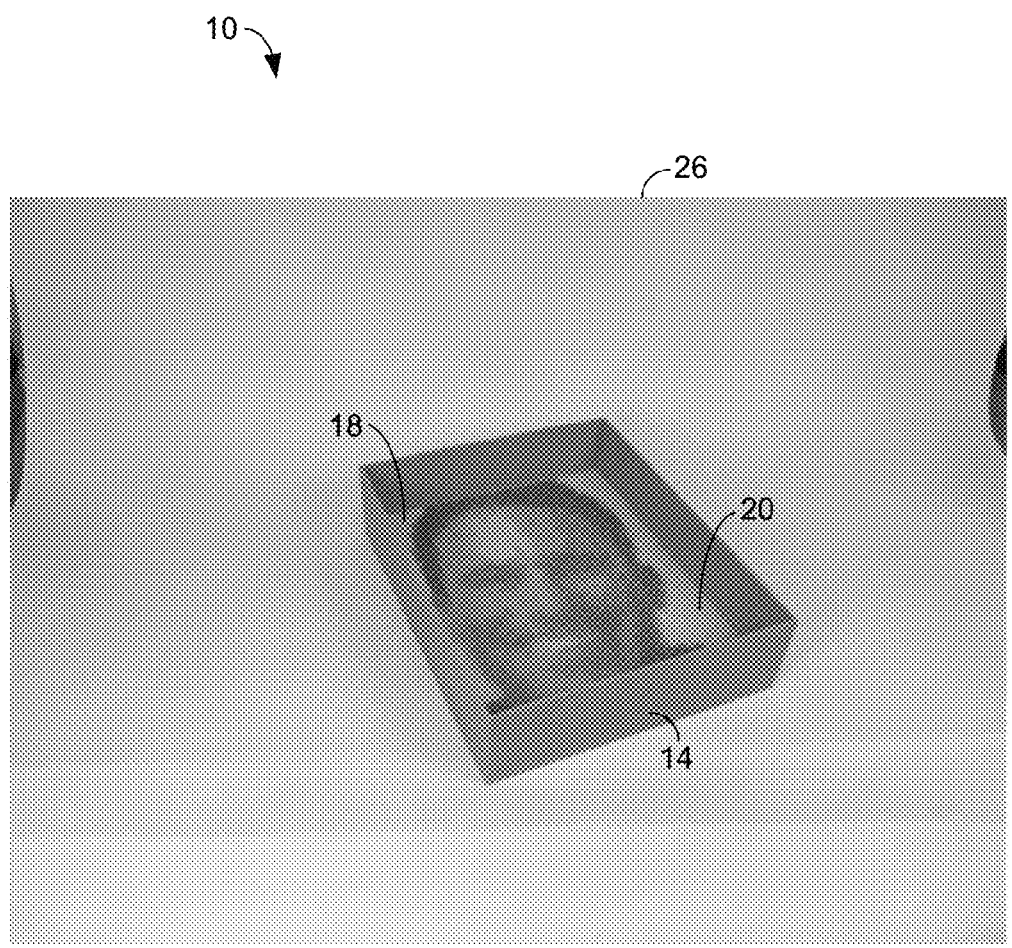
FIG. 4 illustrates a top perspective view of a partially assembled pixel art crayon photo array, in accordance with an embodiment of the present invention.
Figure 5:
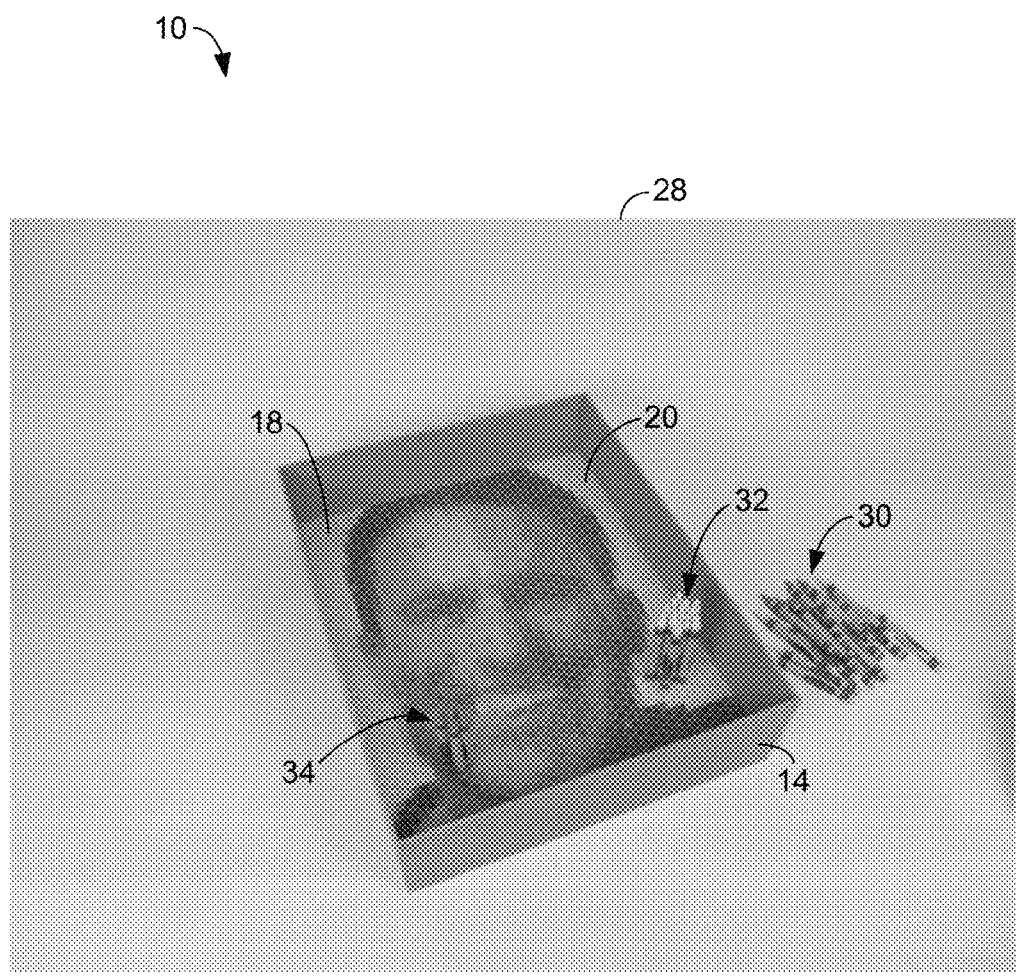
FIG. 5 illustrates a top perspective view of a partially assembled pixel art crayon photo array including crayons being received by openings in the transparent plastic grid, in accordance with an embodiment of the present invention.

In one embodiment, the transparent plastic grid 20 may be arrayed with many openings configured to receive a colored crayon. For example, the transparent plastic grid 20 may include an array of openings that are round, cylindrical, triangular, oblong, oval, square, and/or an additional shape oriented along an axis that is configured to correspond to a shape of a coloring element, such as a crayon body, with round openings and/or cylindrical slots that receive and hold crayons in a particular position corresponding to the pixelated image template 18. As such, a frame 14 may be configured to secure the pixelated image template 18 in a first position 22 (FIG. 2), prior to receiving the overlaid grid 20 structure in a second position 24 (FIG. 3), with the openings of the grid 20 adjacent and corresponding to the pixels assigned in the template 18 in the third position 26 (FIG. 4).

In one embodiment, the arrangement of the openings in the grid 20 structure may be such that all slots align vertically and horizontally with all adjacent slots. In another aspect, the arrangement of slots may be such that even numbered rows of slots are offset slightly horizontally with respect to the slots in each odd numbered row. In this manner, the slots in each odd numbered row may align vertically with the slots in all other odd numbered rows, such as in a "honeycomb" configuration. Likewise, the slots in each even numbered row may align vertically with the slots in all other even numbered rows. In some aspects, the size of the slots may be optimal for receiving and securing a standard-sized crayon body, such as the plurality of crayon bodies 30 in FIG. 5. In some aspects, the pixelated image template 18 includes colors corresponding to the plurality of crayon bodies 30, such as the first crayon color 32 and the second crayon color 34. As such, gradient pixel assignments 36 may be applied to various portions of a template 18 such that the resulting crayon pixel image includes crayon bodies 30 that replicate the coloration of the original template 18, as shown in the comparison view of FIG. 6. Based on assembling the plurality of crayon bodies 30 within the frame 14, and according to the pixels of the template 18 and the positioning mechanism of the grid 20. Accordingly, the final artwork may be composed entirely of crayons to form a pixelated crayon image 38, as in FIG. 7, that when viewed from a perspective in FIG. 8, maintains an image resolution 40 utilizing the crayon body 30 tips within the pixelated crayon image 38.

Embodiments of the invention also include a process for producing pixelated crayon artwork. In the illustrative embodiment of FIG. 9, exemplary components of a pixel art system 50 are provided. In this example, the pixel art system 50 includes a receiving component 52 for receiving a desired pixel-art image, such as a user-submitted photo or other image for generating a pixelated template. As such, the user content component 54 provides one or more items of content received by the receiving component 52, which may then be analyzed by the determining component 56 for pixel color assignment by the pixel color assignment component 58. Based on the pixels assigned to a particular image, including the color, shading, gradient, brightness, or other aspects of coloring analysis carried out during pixel color assignment, a template generating component 60 may be used to provide a template for generating pixel art. Such template for the pixel art system 50 may include a printed template provided on a surface, such as paper, that may be placed in association with one or more assembly devices for assembling the desired pixel art.

Figure 9:
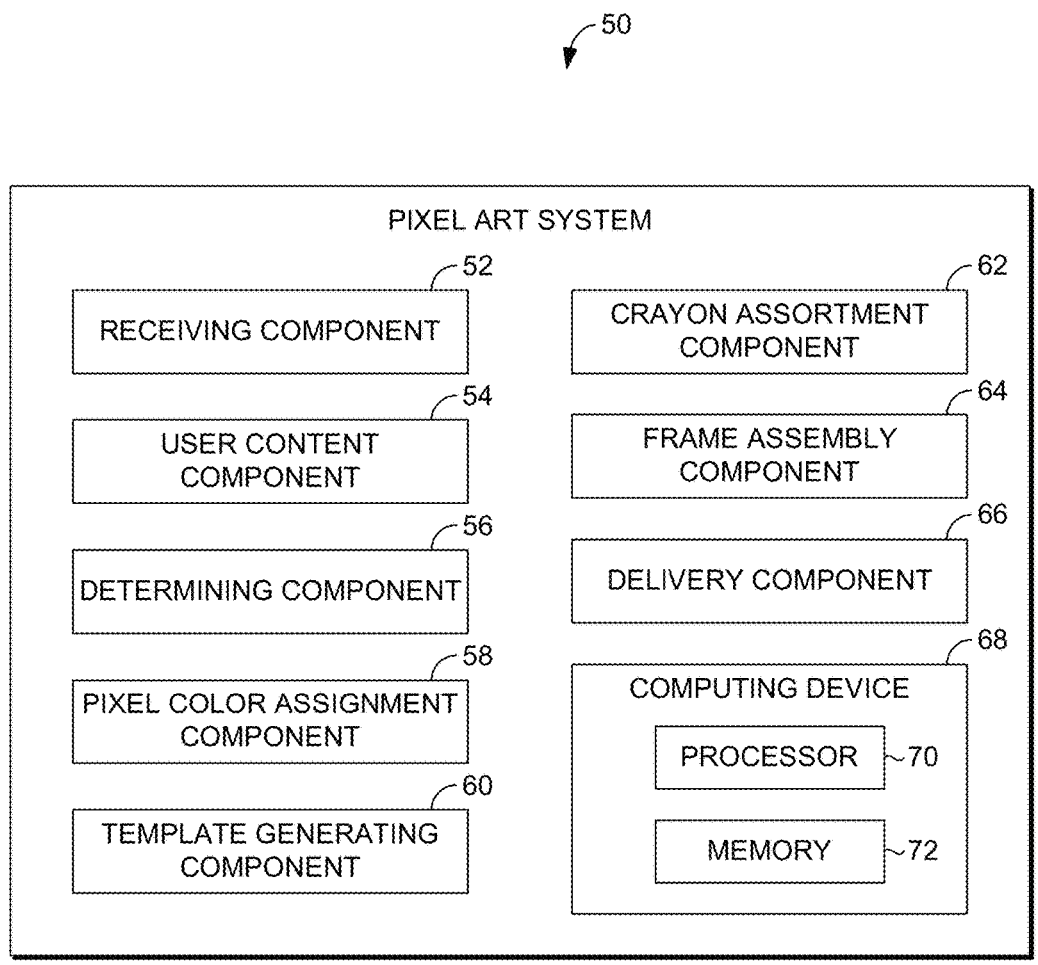
FIG. 9 is a diagram of the components of the pixel art system, in accordance with an embodiment of the present invention.

Accordingly, having assigned specific pixel colors to a particular image and generating a template for the desired artwork, a crayon assortment component 62 may be used to generate a desired number of crayon bodies having colors corresponding to a determined number of crayons needed to satisfy the generated template. Additionally, a frame assembly component 64 may provide a frame assembly corresponding to the generated template, and according to the crayon assortment, or other desired coloring element provided by the pixel art system 50. In further aspects, a delivery component 66 may provide one or more features and/or outputs of the pixel art system 50, such as providing a completed kit including a set of desired coloring elements (e.g., crayon bodies), with a generated pixel art template and a frame assembly component having at least one grid structure for assembling the pixel art product. In further aspects, as shown in the example of FIG. 9, a computing device 68 may be accessed, having a processor 70 and a memory 72, for performing one or more functions of the pixel art system 50, such as determining pixels associated with received user content, assigning pixel colors to a determined user image, and/or generating a template based on the assigned pixel colors for a particular image.

Figure 10:
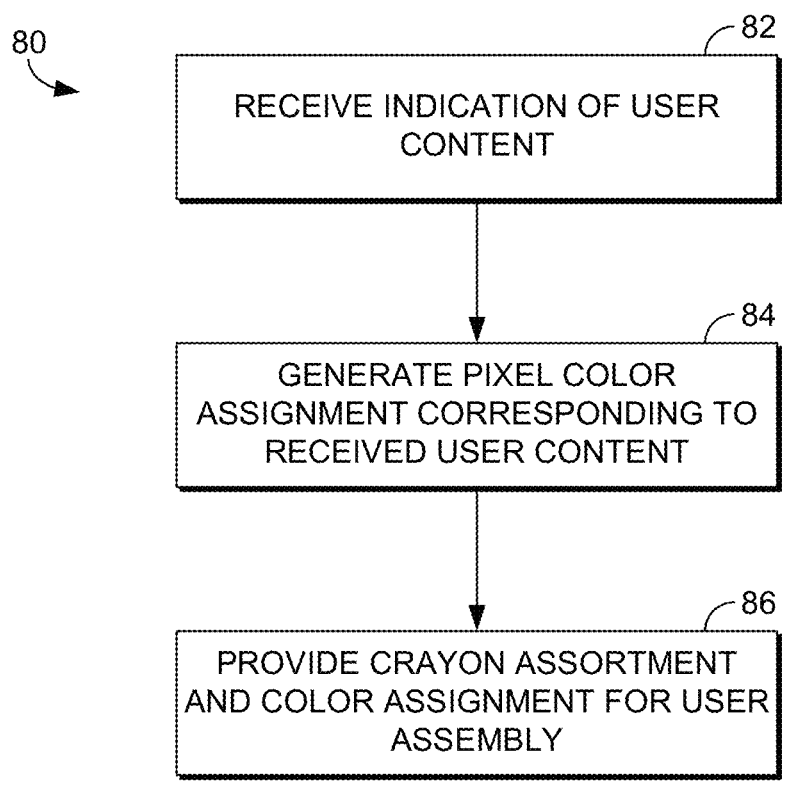
FIG. 10 illustrates a method of converting a user image into a pixel art crayon photo array kit, in accordance with an embodiment of the present invention.

In the illustrative example of FIG. 10, a method 80 of generating a pixel-assigned coloring template is provided. At block 82, an indication of user content is received. For example, a pixel art system or service may receive a user-submitted image, such as a photo, for generating pixel art using crayons, markers, ink, or another coloring element that provides variable colored features for aligning with a pixel-assigned template. At block 84, a pixel color assignment corresponding to the received user content is generated. In some embodiments, the color assignment may be generated according to a finite number of coloring options, such as a finite number of colors within a certain range, hue, tone, or coloration. In one aspect, a grayscale assignment feature may be utilized to assign one of multiple colors of gray coloring elements to a particular feature of a pixelated image, such as a first shade of a grey to a lighter portion of an image and a second shade of grey to a darker portion of an image. In further aspects, one of multiple coloring options may be assigned via the pixel color assignment, such as a range of colors within a specific tone, shade, or tint applied to an image.

At block 86, in one embodiment of the invention, the crayon assortment and color assignment are provided for user assembly, according to the pixel assignment of block 84. For example, for a pixel-assigned image including at least ten segments with a first shade of red, at least ten crayon bodies having a first red shade may be included in the crayon assortment. Similarly, a template generated to present the color assignment to the user may be provided, such as a coloring template having pixel assignment and corresponding to the grid assembly structure (e.g., holes in a grid assembly mechanism).

In further embodiments of the invention, at block 88, a color feature kit comprising pixel color assignment and coloring elements corresponding to the user content are provided. For example, a color feature kit may include a template identifying the pixels assigned to the various colors identified in the user-submitted content, such as the range of assigned colors in a user photo. Additionally, the coloring elements corresponding to the assigned pixels may also be included, such as a series of marker end plugs having the corresponding colors that provide a sufficient number and shade of coloring elements to complete the desired pixel art. In one embodiment, the coloring feature kit may include one or more grid structures for assembling a pixel art structure, such as a grid structure for supporting a crayon body, or a material matrix for supporting an ink coloring, as further discussed below.

Figure 11:
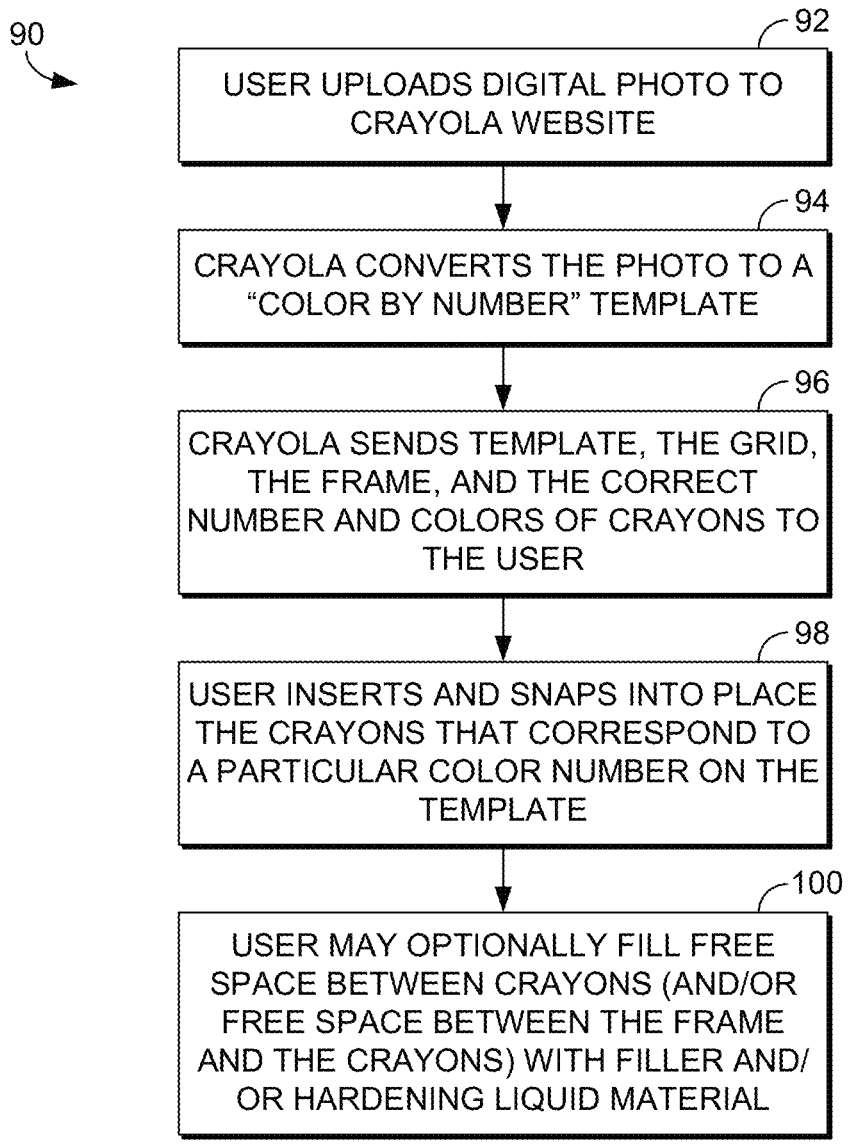
FIG. 11 illustrates a method of creating a pixel art crayon photo array, in accordance with an embodiment of the present invention.

In further embodiments, as shown in FIG. 11, a method 90 for creating a pixel art crayon photo array is provided. In one embodiment, a user image is received, such as a user-uploaded digital photo received via a website, at block 92. In another embodiment, a digital image is provided to a server via a website. At block 94, a photo is converted to a "color by number" template comprising a plurality of pixels. In further aspects, a computer program (e.g., a software component of the pixel art system) converts the uploaded image into a "color-by-number" style template. Pre-defined dimensions of the final artwork frame may be used to determine the number of crayon-sized pixels that will be used, according to one embodiment. In some aspects, pixel colors may be limited to a particular number of color values, such as 128 different color values corresponding to the number of different crayon colors offered, for example, by Crayola LLC, Easton, Pa.

Figure 2:
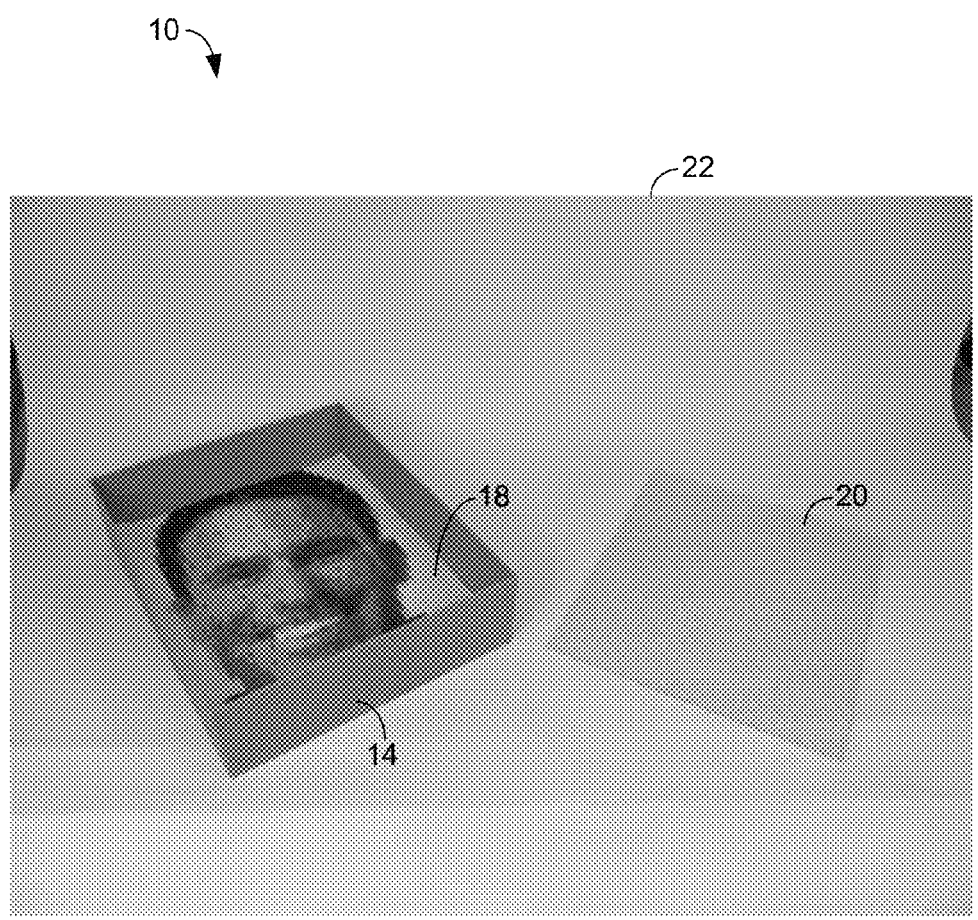
FIG. 2 illustrates a top perspective view of a pixel art crayon photo array in which a pixelated image template has been placed inside a framed box, in accordance with an embodiment of the present invention.
Figure 3:
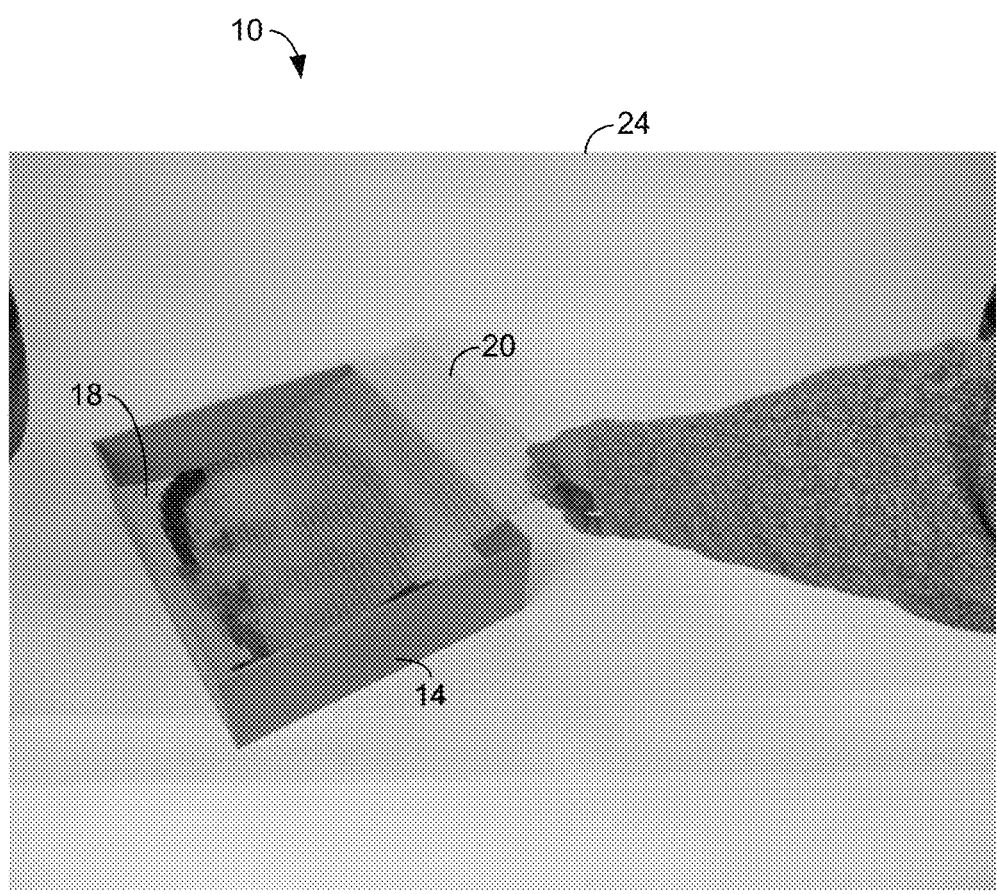
FIG. 3 illustrates a top perspective view of a pixel art crayon photo array in which a transparent plastic grid is being placed over the pixelated image template, in accordance with an embodiment of the present invention.
Figure 6:
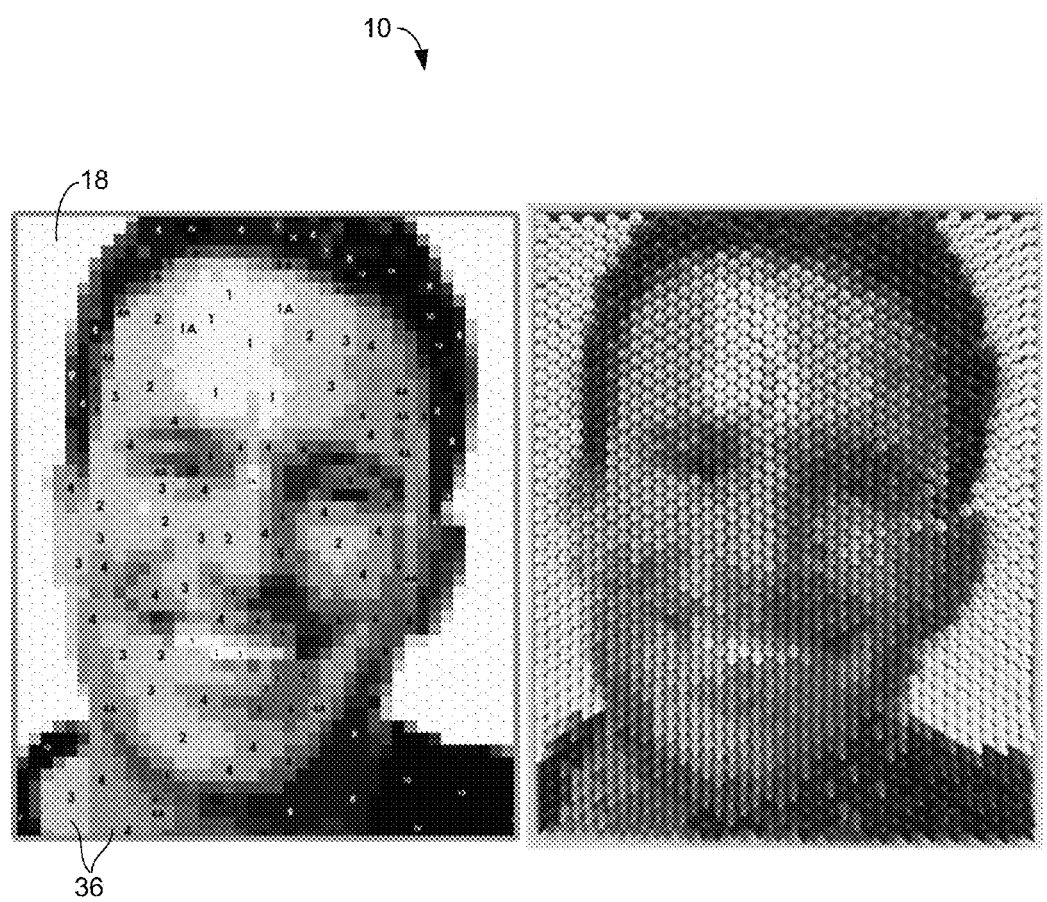
FIG. 6 is a front elevation view of a pixelated image template and a corresponding assembled pixel art crayon photo array, in accordance with an embodiment of the present invention.

In further embodiments of the invention, areas of similar color on the original image may be grouped together by the software and assigned a numerical value, such as the exemplary color assignment illustrated in FIG. 10. A new template image may be generated by the software with significantly reduced resolution compared to the original uploaded image, resulting in a pixelated appearance. In further aspects of the invention, color numbers are assigned to the appropriate areas on the template image, as shown in the example of FIG. 6. Accordingly, the user may download and print this template for placement in the frame, as shown in FIG. 2, at which time an order may be placed with the manufacturer to ship the correct colors and number of crayons to the user.

At block 96, a template, grid, frame, and correct number and color of coloring elements may be provided to a user. In embodiments of the invention, a user may place the transparent plastic grid over the pixelated image template (e.g., FIGS. 3-4). At block 98, a user-inserted coloring elements corresponding to the particular color number on the template may be received. For example, the user may then place crayons (with the assignment of numbers to specific colors provided by the manufacturer, in one embodiment) into the corresponding/correct slots using the numbers on the underlying template as a guide (e.g., FIG. 5). For example, if number 5 corresponds to a white crayon, the user may populate all of the slots located above a region numbered "5" on the template image with white crayons. In some embodiments, the completed artwork (e.g., FIGS. 6-8) will closely resemble the original image, with reduced resolution producing a pixelated effect.

Embodiments of the invention may also include a kit containing the frame and grid features, directions to upload/download images to/from the server, and directions on how to obtain the correct number and colors of crayons. As shown at block 100, a user may then apply a filler and/or hardening material between coloring elements. Additional embodiments include optionally filling any free space within the artwork (e.g., between crayons and/or crayons and the walls of the frame) with a filler material that may harden and further secure the artwork. In a further embodiment, a crayon photo kit may include modular frames and crayon-holding grids to allow the user to assemble a frame and grid of a size of their choice. For example, one method of assembling the modular frame and crayon-holding array is via snap/fit construction.

Figure 12:
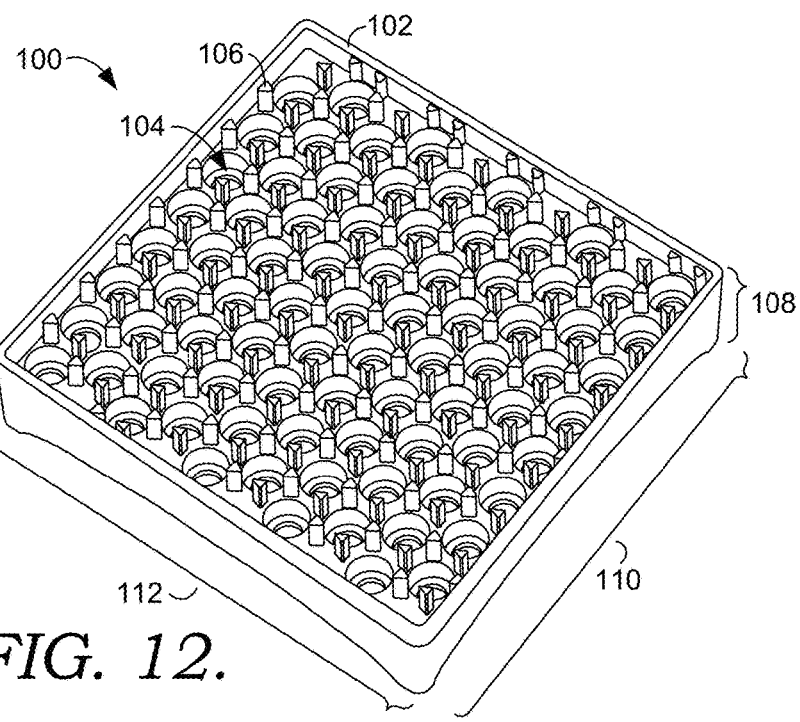
FIG. 12 is a perspective view of an assembly grid for generating a pixel art crayon photo array, in accordance with an embodiment of the invention.

Turning next to the embodiment of FIG. 12, a perspective view of an assembly grid 100 includes a modular tray body 102 having a plurality of apertures 104 that are adjacent a plurality of triangular pegs 106 for supporting one or more cylindrical crayon bodies within the apertures 104. In one aspect, the assembly grid 100 includes a depth 108, a length 110, and a width 112 that provides a particular number of rows and columns of apertures 104, in a particular orientation, for generating at least a portion of a pixel art crayon photo array, in accordance with an embodiment of the invention.

In the example of FIG. 12, the assembly grid 100 includes a series of organized apertures 104 that are oriented for serial insertion of at least a portion of the crayon bodies within the apertures 104. For example, a number of rows along the length 110 and a number of columns along the width 112 may provide a particular number of apertures 104 for crayon insertion, such as an assembly grid 100 including 80 apertures 104. In further aspects, the number, position, and/or placement of the corresponding and/or surrounding triangular pegs 106 may provide at least one support structure for engaging at least a portion of a crayon body inserted into an adjacent aperture 104.

Figure 7:
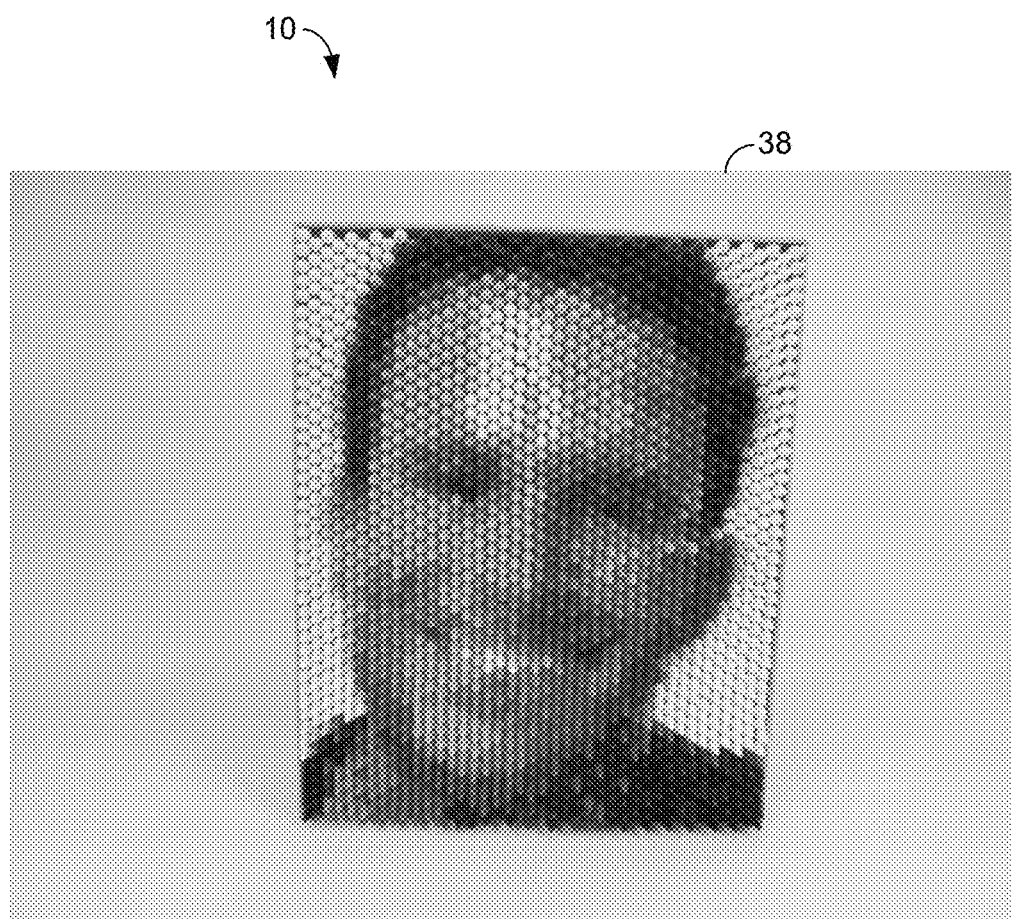
FIG. 7 is a front elevation view of an assembled pixel art crayon photo array, in accordance with an embodiment of the present invention.
Figure 8:
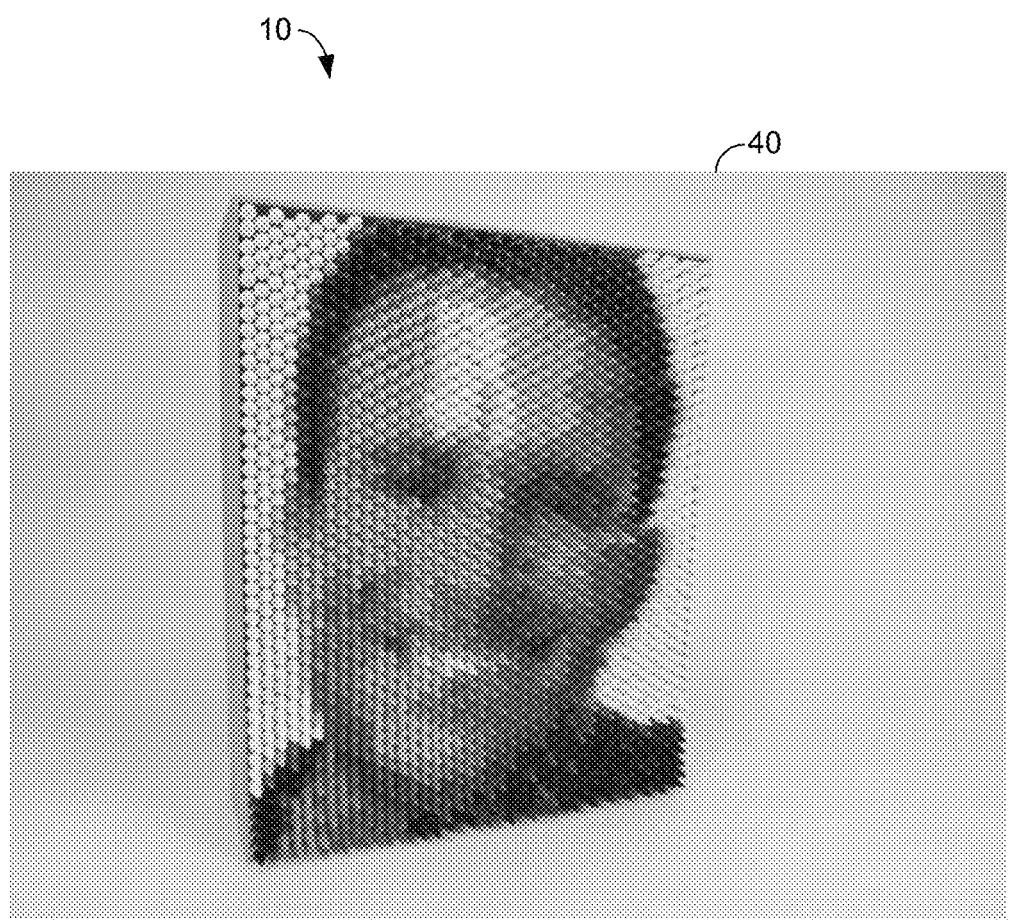
FIG. 8 is a front perspective view of an assembled pixel art crayon photo array, in accordance with an embodiment of the present invention.

In one aspect, an aperture 104 of the assembly grid 100 may be configured to receive at least a portion of a crayon body tip for assembling a pixel art crayon photo array, such as the crayon array depicted in the example of FIGS. 6-8. In one aspect, multiple assembly grids 100 may be used to assemble multiple sets of crayon bodies for final assembly into the completed pixel art crayon photo array. As such, while depicted in the example of FIG. 12 as including 80 apertures 104 oriented in a herringbone and/or staggered orientation with respect to the length 110 and the width 112, the assembly grid 100 may be used to assemble a first set of crayon bodies for assembling with additional sets of crayon bodies that collectively complete the pixel art crayon photo array. Additionally, once the plurality of crayon bodies positioned within the apertures 104 of the assembly grid 100 are adhered to each other, such as by gluing at least a portion of each crayon body to one or more adjacent crayon bodies, the adhered crayon bodies from a first instance of assembly may be removed from the assembly grid 100, and a second set of crayon bodies may be inserted into the assembly grid 100 during a second instance of assembly. As such, the universal assembly grid 100 may be used to position multiple crayon bodies in a particular arrangement, maintain such arrangement during gluing of the adjacent crayon bodies, suspend the crayon bodies from a surface beneath the assembly grid 100 based on a depth 108, permit removal of the crayon bodies from the assembly grid 100 as a collective, glued segment of a pixel art image, and facilitate assembly of subsequent segments of a pixel art image with additional crayons and glue. Further, the assembled, glued segments may correspond to at least a portion of a particular pixel art image and, once complied as neighboring units, may form a completed pixel art image of crayon bodies, as further described below.

In one embodiment of the invention, the assembly grid 100 may include a number and/or position of apertures 104 that are oriented for alignment with a numbered pixel art template. In some embodiments, each aperture 104 of an assembly grid 100 may be placed over a numbered pixel assigned to a desired image, providing a visual indication to a user regarding which color of crayon should be positioned in which aperture 104. In some embodiments, the number and/or position of apertures 104 may align with multiple, adjacent segments of a numbered pixel art template, such as a gridded/assigned template including color pixel assignments corresponding to multiple assembly grid 100 structures. For example, a pixel art template may include two grid assemblies along a horizontal axis and two grid assemblies along a vertical axis. In this example, the 2×2 grid including four assembly grids 100 may be used to divide the 160×160 crayon matrix into individual cells for populating with particular crayon colors. In another example, a larger pixel art crayon photo array may be desired, requiring multiple assembly grids 100 worth of pixel assignments along a horizontal axis, and multiple assembly grids 100 worth of pixel assignments along a vertical axis. Such assembly grid 100 may include the staggered and/or herringbone orientation of the exemplary apertures 104 of FIG. 12, thereby increasing a contact surface between at least a portion of the adjacent crayons secured by the assembly grid 100. In a further example, a pixel art template may include 4 assembly grids 100 along a first axis and five assembly grids 100 along a second axis, with each assembly grid including 80 apertures 104, and total number of 1600 crayons assembled in a completed pixel art crayon photo array.

In this example, a first portion of a pixel-assigned photo template may include a number of assigned pixel segments corresponding to the number of apertures in the exemplary assembly grid 100. For example, a first portion of an exemplary photo template may include 80 segments corresponding to the 80 apertures along the length 110 and width 112 of the assembly grid 100. In further aspects, a second portion of an exemplary photo template may include an additional 80 segments corresponding to the 80 apertures along the length 110 and width 112 of the assembly grid 100. As such, the reusable assembly grid 100 may be used to assemble a series of adjacent crayon bodies corresponding to a first portion of a photo template, and upon adhering and removal of such crayon bodies, the assembly grid 100 may be utilized additional times to assembly further portions of the photo template. For example, a first portion of adhered, multiple crayon bodies may be assembled with crayon colors corresponding to a first portion of a pixel-assigned image, a second portion of adhered, multiple crayon bodies may be assembled with crayon colors corresponding to a second portion of a pixel-assigned image adjacent to the first portion of the pixel-assigned image. Upon adhering the first portion of crayon bodies to the second portion of crayon bodies, both assembled with and now separated from the assembly grid 100, the resulting image viewed may provide a crayon-pixelated view of the pixel-assigned image with crayon coloration providing the overall pixel art crayon photo array image.

In another embodiment, the orientation of crayon bodies within the assembly grid 100 may be secured in response to the tapered interior surface of each of the apertures 104. In some aspects, the crayon bodies secured by the assembly grid 100 are separated, at least in part, by one or more of the triangular pegs 106, such that each crayon within the apertures 104 is maintained in a consistent, parallel orientation during assembly and/or adhering. Further, the depth 108 of the assembly grid 100 may be configured to suspend the tips of crayons secured by the assembly grid 100 at a particular distance from a surface so as to not break the tips of the crayons during assembly. In another aspect, each crayon inserted into an aperture 104 includes a tapered tip corresponding to the tapered interior of the aperture 104, which further includes a particular radius and dimension such that the crayons may be assembled in a particular position for joining together as a portion of a completed pixel art image. In this example, a crayon placed vertically within an aperture 104 and secured at least in part by one or more triangular pegs 106, may then be treated with a joining feature between one or more adjacent crayons, such as glue between the crayon bodies during assembly. As shown in the example of FIG. 12, the positioning of crayon bodies along the length 110 and width 112 of the assembly grid 100 may provide a squared and/or modular final orientation of the assembled and adhered crayon bodies, which may then be used to assemble/adhere with additional other blocks of different portions within the same crayon pixel art image.

Figure 13:
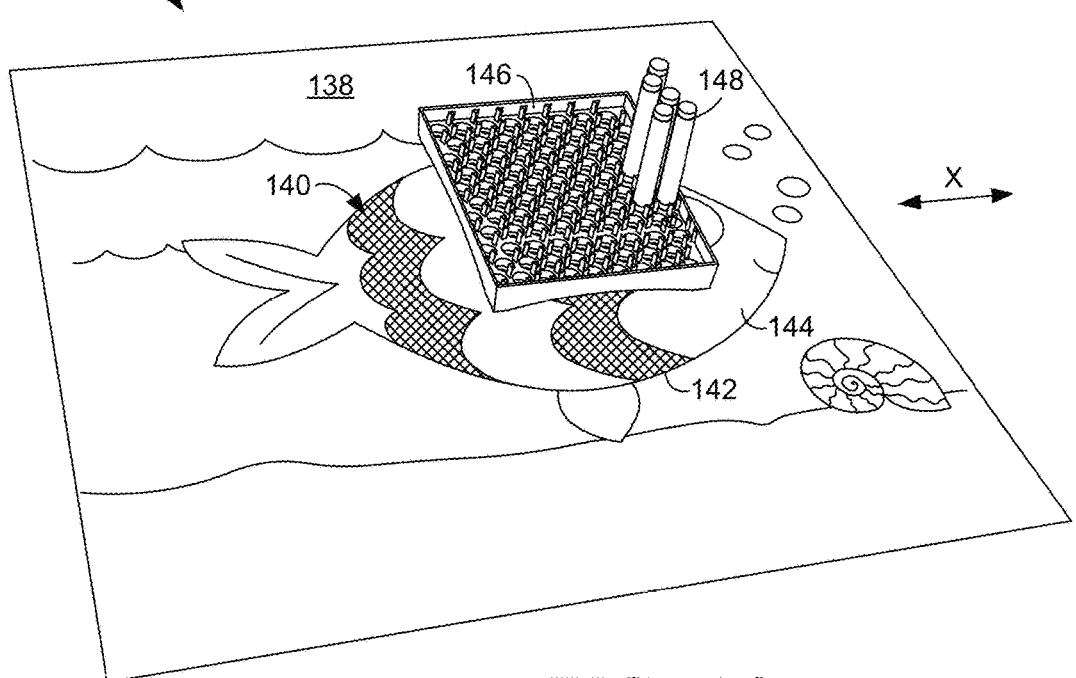
FIG. 13 is a perspective view of an assembly grid positioned with respect to a user image, for generating a pixel art crayon photo array in accordance with an embodiment of the invention.
Figure 14:
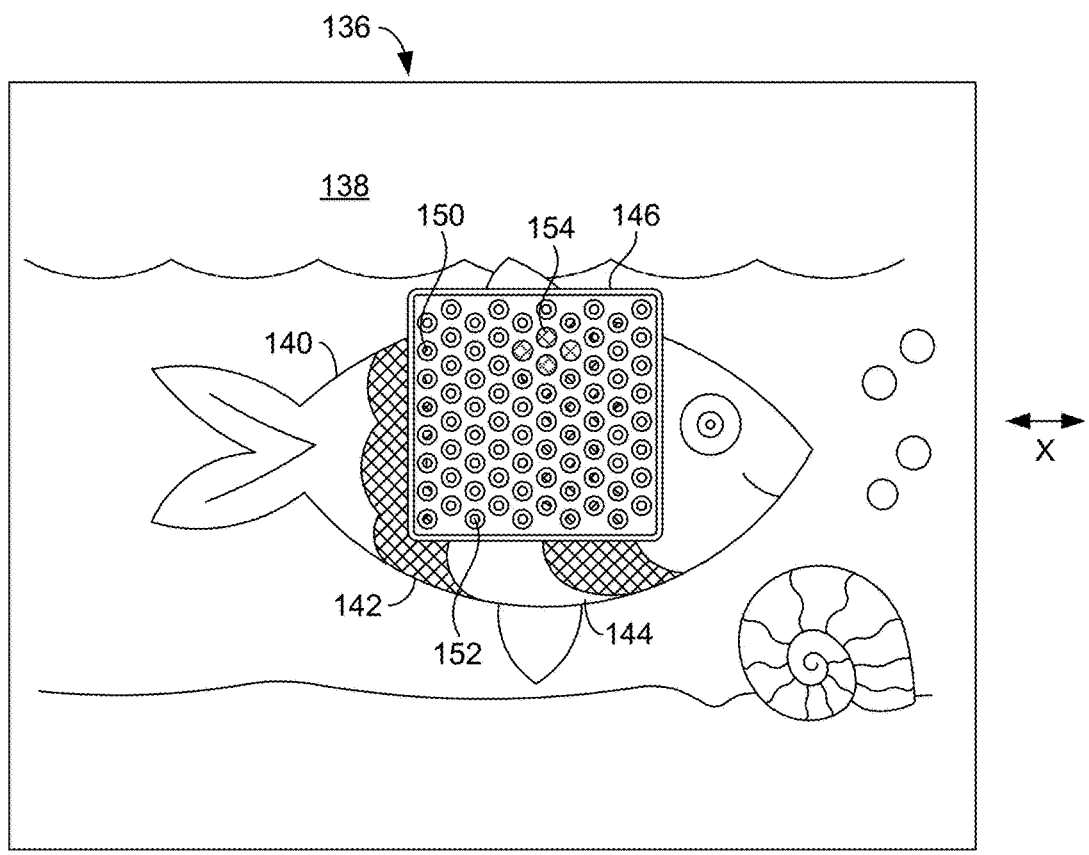
FIG. 14 is a top view of an assembly grid positioned with respect to a user image, for generating a pixel art crayon photo array in accordance with an embodiment of the invention.

In the exemplary embodiment of FIG. 13, an assembly grid 146 is positioned over a template surface 138 having a template image 140 with a first coloring feature 142 and a second coloring feature 144. In this example, the grid 146 is configured to secure multiple crayon bodies 148 in an orientation corresponding to the template image 140, based on alignment of the apertures 104 on the assembly grid 146. As shown in the top view of FIG. 14, the assembly grid 146 is positioned with respect to the user image 140 for generating a pixel art crayon photo array in accordance with an embodiment of the invention. In this example, each aperture 104 of the grid 146 corresponds to a particular color on the template image 140, such as a first color 150 associated with first coloring feature 142, a second color 152 associated with a second coloring feature 144. In further aspects, based on a positioning of each aperture 104 and viewing of the corresponding coloring feature for each pixelated portion of the template image 140, a coloring element 154 may be positioned within the assembly grid 146, such as a crayon body 154.

Figure 15:
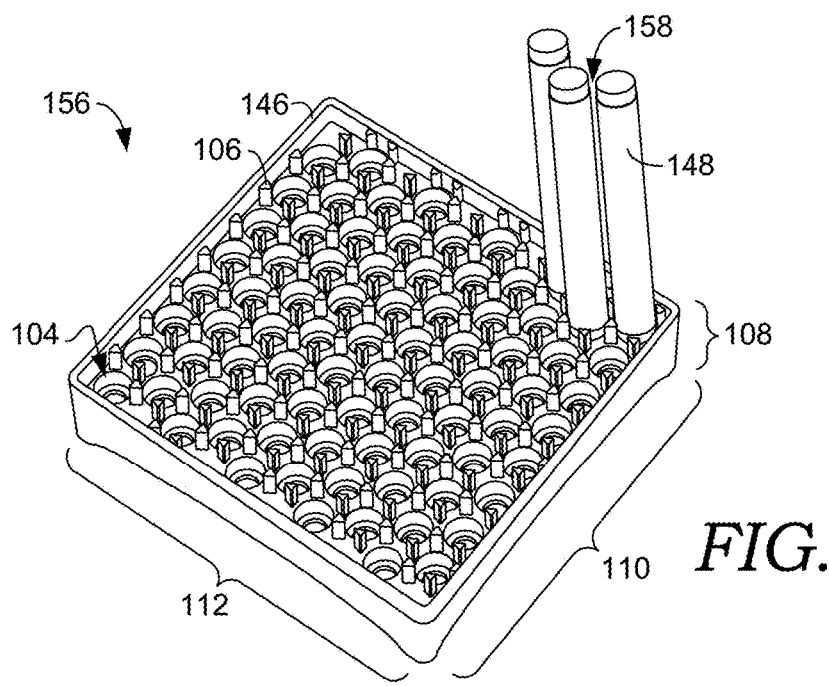
FIG. 15 is a perspective view of an assembly grid for generating a pixel art crayon photo array, in accordance with an embodiment of the invention.
Figure 16:
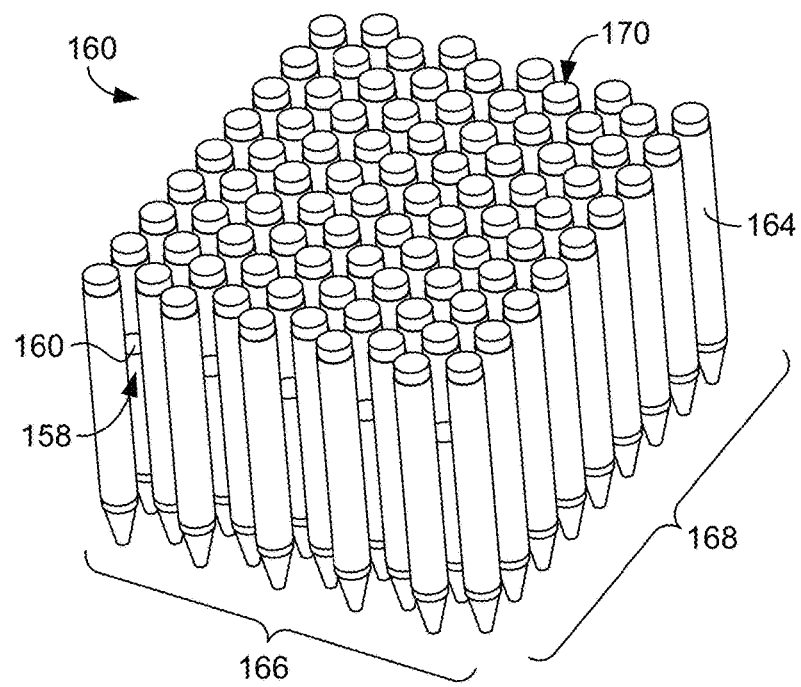
FIG. 16 is a perspective view of an adhered portion of crayon bodies positioned using an assembly grid, in accordance with an embodiment of the invention.

In the perspective view 156 of FIG. 15, the assembly grid 146 is depicted as receiving a plurality of crayon bodies 148, with spacing 158 between each vertically aligned crayon body. As shown in FIG. 16, an adhered portion 160 of crayon bodies 164 include an attachment portion 162 within the spacing 158, such as a portion of glue or other adhesive for joining the adjacent crayon bodies 164. As such, the crayon tips along the width 166 and length 168 of the adhered portion 160 are positioned in a common plane, while the corresponding alignment 170 of each crayon end is maintained, with such consistent alignment based on adhering the crayon bodies 164 in an assembly grid 146, and subsequently removing the assembly grid (i.e., after gluing and/or adhering adjacent crayon bodies 164).

Figure 17:
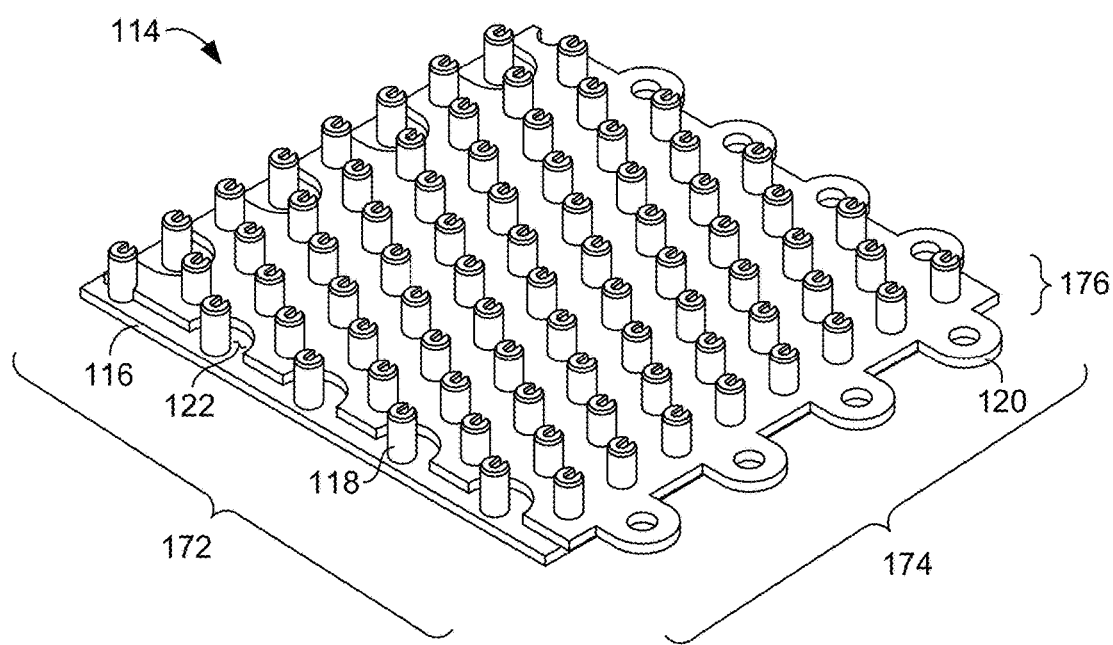
FIG. 17 is a perspective view of an assembly grid for generating a pixel art end plug array, in accordance with an embodiment of the invention.

In further embodiments of the pixel art apparatus and system, as shown in FIG. 17, an assembly grid 114 for generating a pixel art end plug array is provided in accordance with an embodiment of the invention. In this example, the assembly grid 114 includes a grid base 116 with a plurality of pegs 118 arranged in a staggered and/or herringbone orientation, similar to the apertures 104 of the assembly grid 100 in the embodiment of FIG. 12. Further, the grid base 116 may include connecting portions 120 and receiving portions 122 for assembling multiple assembly grids 114 together to form a pixel art end plug array. As shown in the embodiment of FIG. 17, the grid base 116 may include a grid base width 172, a grid base length 174, and a depth 176 configured to generate at least a portion of a pixel art array.

Figure 18:
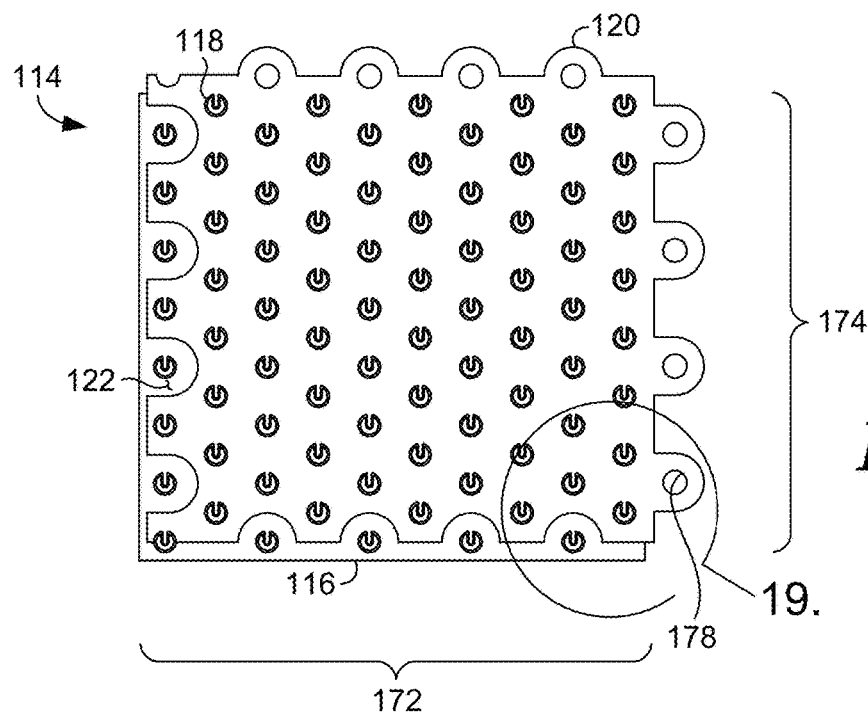
FIG. 18 is a top view of the assembly grid of FIG. 17, in accordance with an embodiment of the invention.
Figure 19:
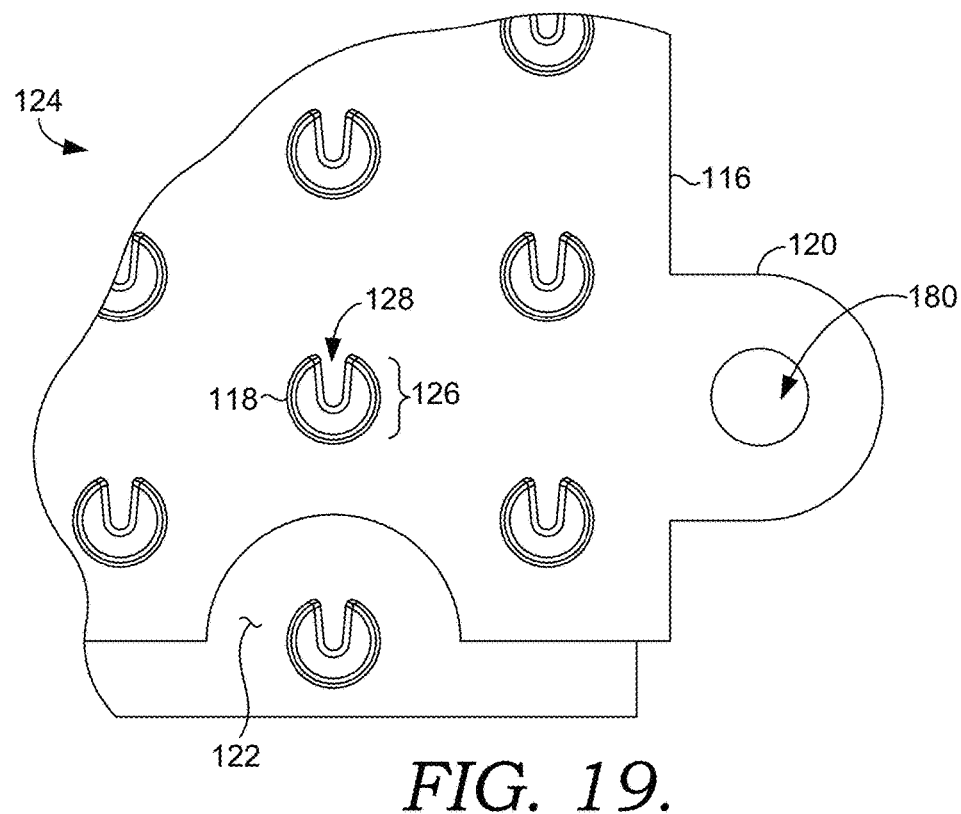
FIG. 19 is an enlarged portion of the top view of FIG. 18, in accordance with an embodiment of the invention.

In FIG. 18, the top view of the assembly grid 114 includes an additional view of the orientation of the connecting portions 120, with apertures 178, and receiving portions 122. As such, in FIG. 19, the enlarged view 124 of the peg structure 126 of each peg 118 may include at least one cavity 128 corresponding to at least a part of a marker end plug structure, and further depicts apertures 180 in the connecting portions 120 for mating to adjacent receiving portions 122. For example, in one embodiment of the invention, the cavity 128 of the peg structure 126 may correspond to at least a part of a marker end plug interior surface. As such, the peg structure 126 may provide at least one surface for generating a snap-fit assembly of marker end plugs to the assembly grid 114.

Figure 20:
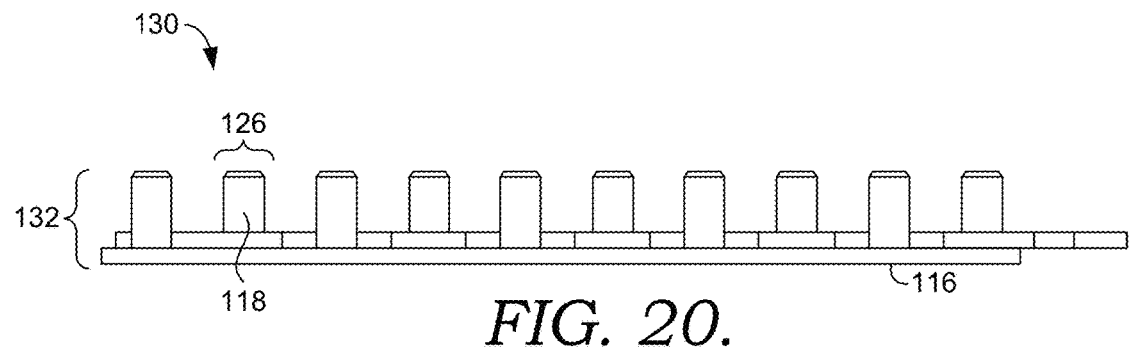
FIG. 20 is a side view of an exemplary assembly grid for generating a pixel art end plug array, in accordance with an embodiment of the invention.
Figure 21:
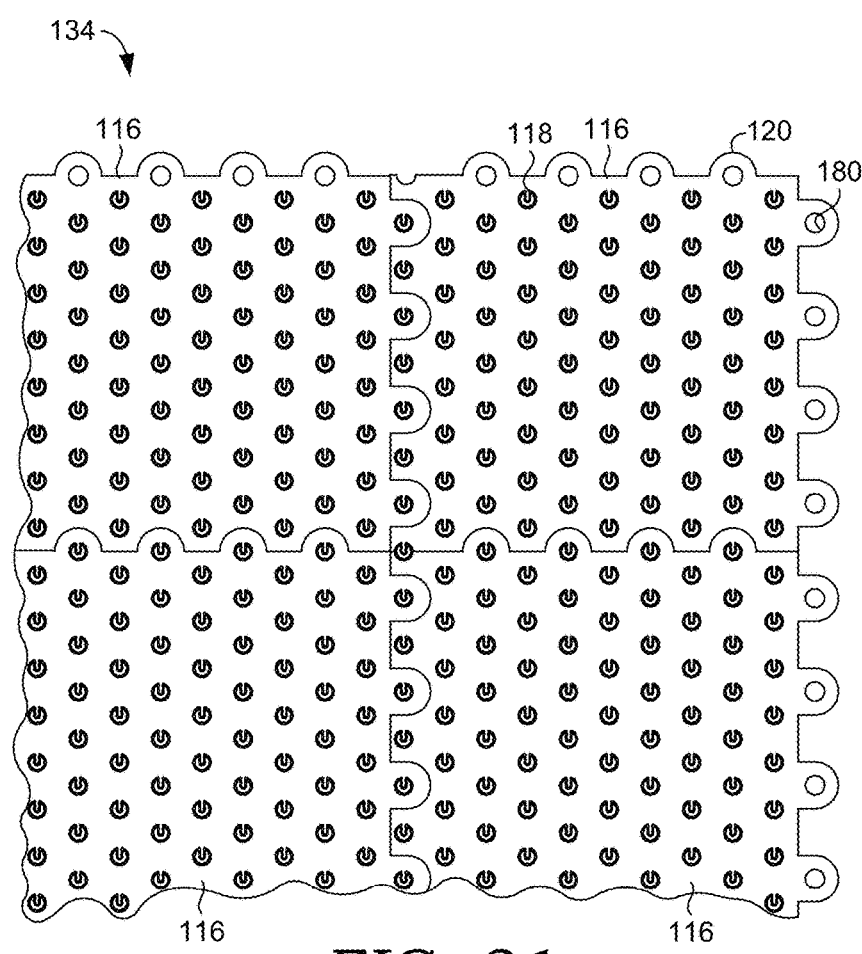
FIG. 21 is a top view of multiple coupled assembly grids for generating a pixel art end plug array, in accordance with an embodiment of the invention.
Figure 22:
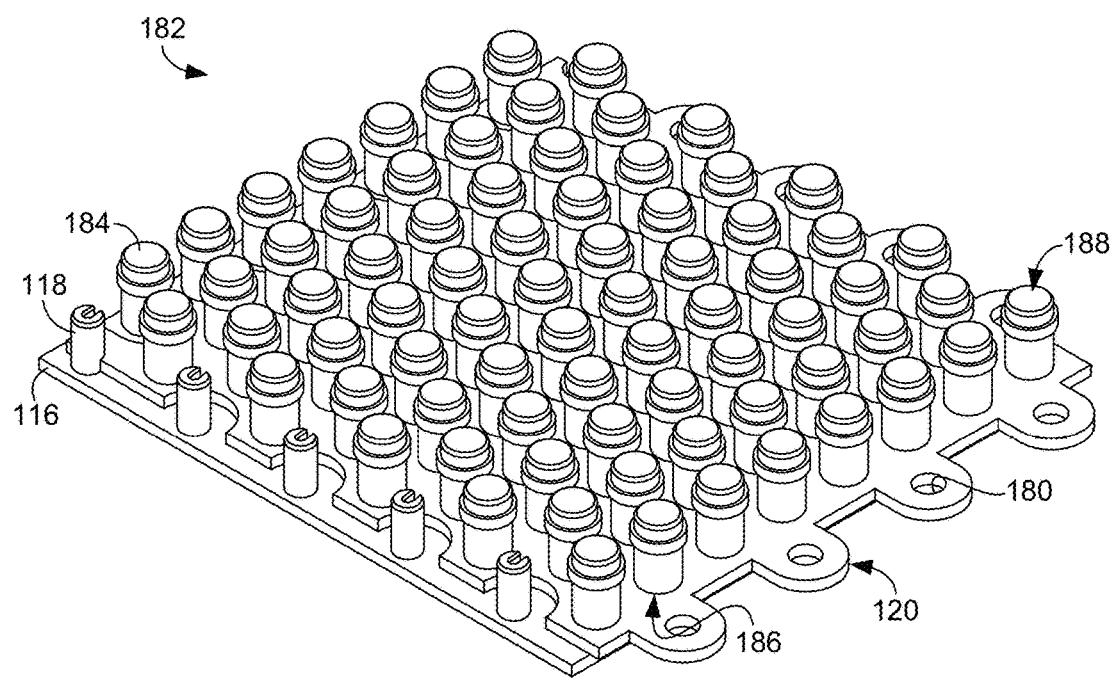
FIG. 22 is a perspective view of an exemplary assembly grid having end plugs coupled to the upper features of the assembly grid, in accordance with an embodiment of the invention.

In FIG. 20, a flat assembly surface may be used to connect neighboring grid bases 116 such that each assembly grid 114 is in a single plane orientation 130. The assembly grid 114 may further include a grid depth 132 that corresponds to the internal diameter of a marker end plug cavity. As such, the grid depth 132 and/or peg structure 126 may provide a locking structure for securing multiple different-colored marker end plugs that collectively correspond to a multi-grid system 134 for depicting a pixel-assigned image, as shown in FIG. 21 with multiple grid bases 116 adjoined. In FIG. 22, the grid structure 182 includes multiple marker end plugs 184 coupled to adjacent peg structures of a grid base 16, and accordingly, a multi-grid system 134 may depict a completed user image, as shown in the crayon-body example of FIGS. 6-8. Upon removably coupling one or more marker end plugs 184 to the one or more pegs 118, each end plug having a coloring end 188 and an attachment and 186, the completed pixel art image may be represented by colors of marker end plugs that are assigned to corresponding colors in an original, pixel-assigned image.

Figure 23:
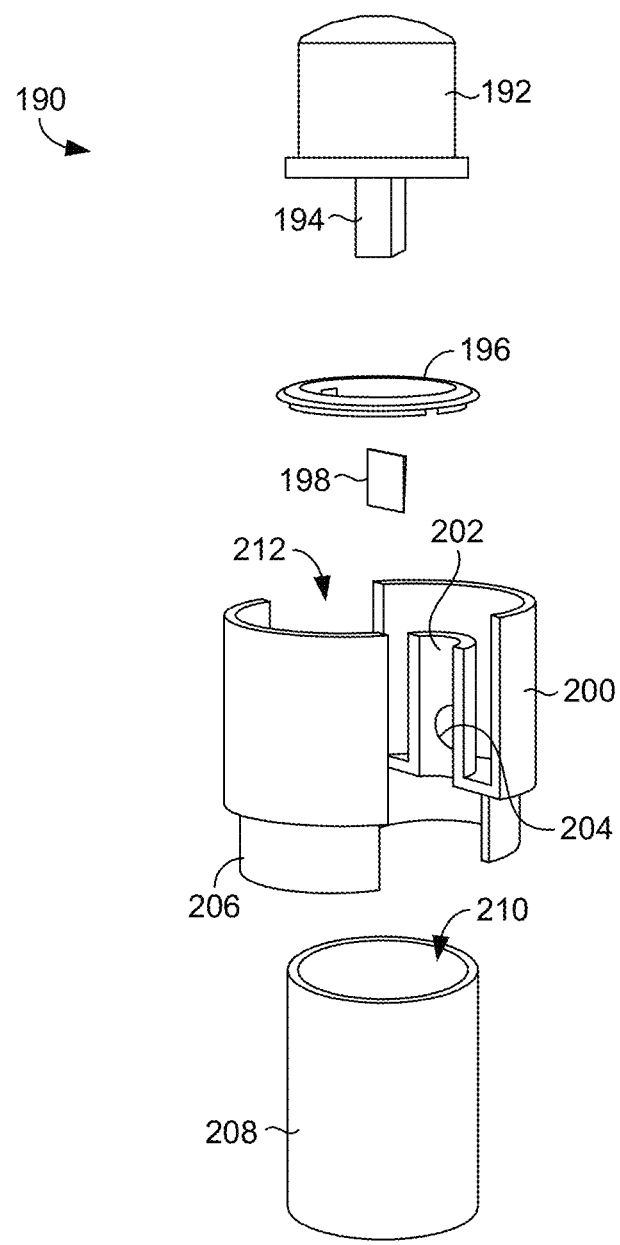
FIG. 23 is an exploded view of a crayon chopping mechanism configured to divide a crayon body into cut segments, in accordance with an embodiment of the invention.

Turning next to FIG. 23, an exploded view of a crayon chopping mechanism 190 is configured to divide a crayon body into cut segments, in accordance with an embodiment of the invention. In the embodiment of FIG. 23, a crayon chopping mechanism 190 may include a plunger feature 192, a blade securing feature 194, a ring structure 196, a blade 198, a collar feature 200 having an interior chamber 202 with a crayon opening 204, and a coupling ring 206 that secures the collar feature 200 to a base cylinder 208 having an interior 210. In some aspects, a crayon inserted into the interior compartment 212 of the chopping mechanism 190 may be used to divide a crayon body into one or more segments for generating pixelated art, according to one embodiment of the invention.

Figure 24:
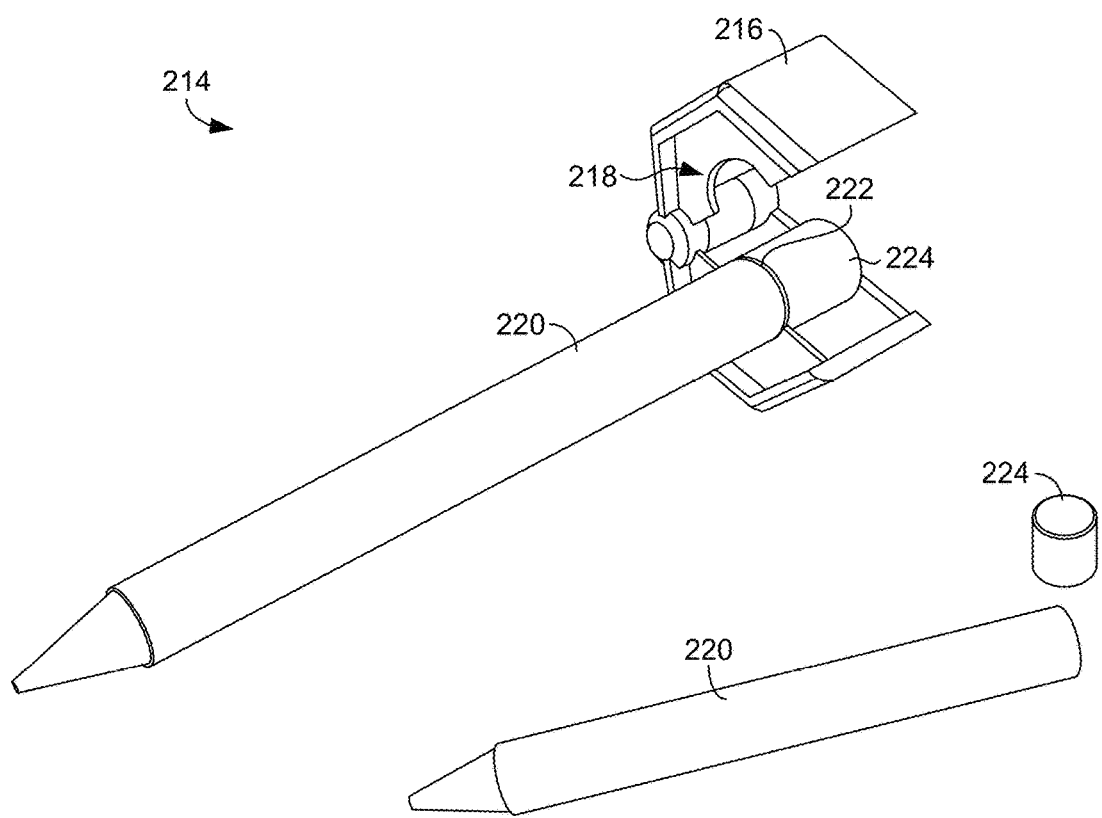
FIG. 24 is a perspective view of a crayon cutting mechanism for separating cut segments of a crayon body, in accordance with an embodiment of the invention.
Figure 25:
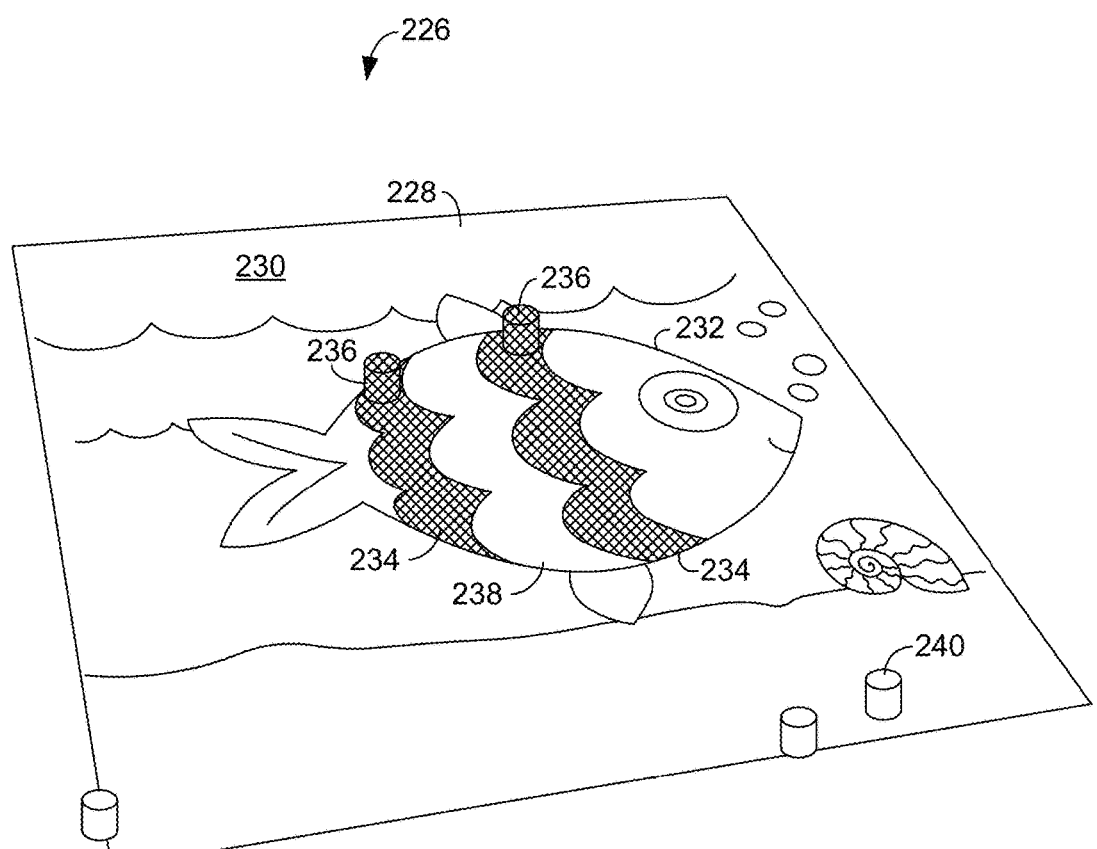
FIG. 25 is a perspective view of a coloring template associated with multiple crayon segments having colors corresponding to the coloring template image, in accordance with an embodiment of the invention.
Figure 26:
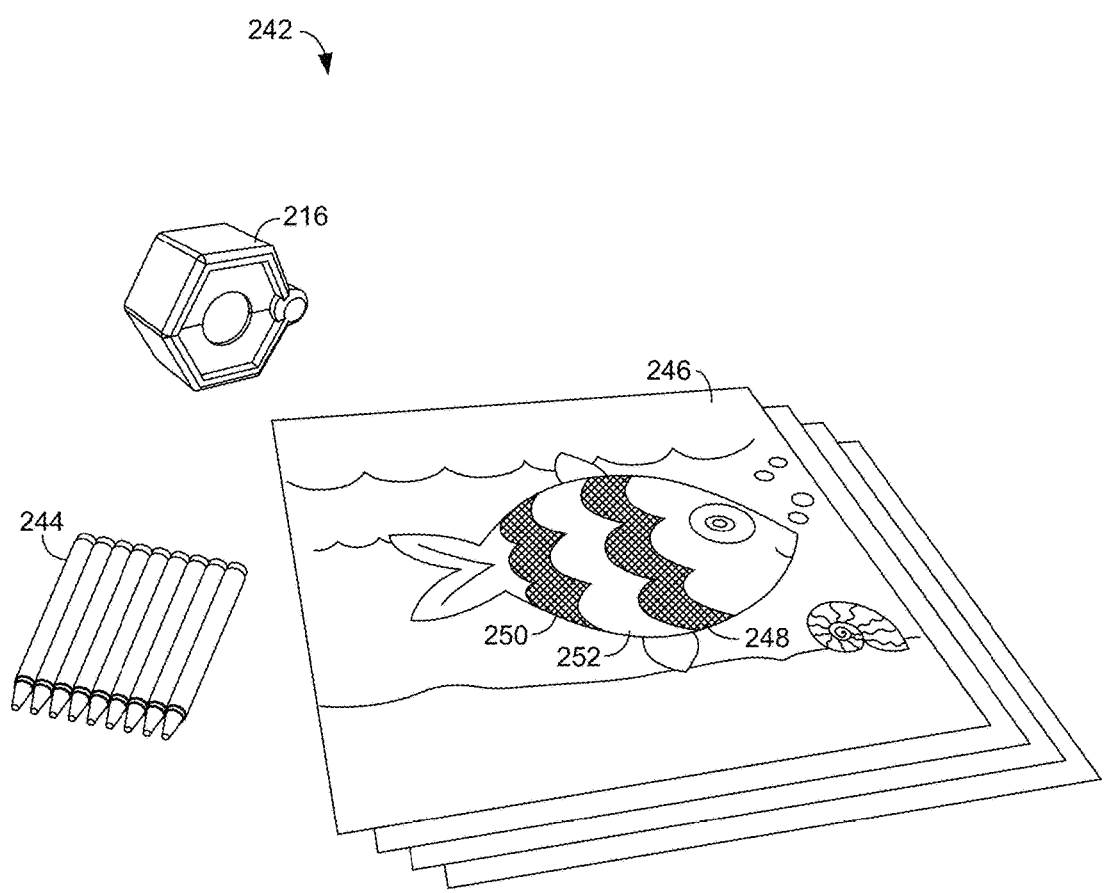
FIG. 26 is a perspective view of a coloring template kit having a crayon cutting mechanism, crayon bodies, and coloring template pages having coloring template images associated with the colors of the crayon bodies, in accordance with an embodiment of the invention.

In the embodiment of FIG. 24, a perspective view of a crayon cutting mechanism 214 for separating cut segments of a crayon body is provided. The crayon cutting mechanism 214 may include a holder 216 having an internal edge 218 that contacts a crayon body 220 to imprint a break line 222 and separate an end segment 224. As such, one or more segments of a crayon body 220 may be used to generate a pixelated art image, such as the coloring template 226 of FIG. 25 having a template 228 with a template image 230 and coloring elements 234 corresponding to crayon color 236, and coloring elements 238 corresponding to crayon color 240. As such, the template 228 may be associated with multiple crayon segments having colors corresponding to the various colors within coloring template image, in accordance with an embodiment of the invention. In FIG. 26, a perspective view of a coloring template kit 242 having a crayon cutting mechanism with a crayon holder 216, crayon bodies 244, and coloring templates 246 is provided, with coloring elements 248, 250, and 252.

Figure 27:
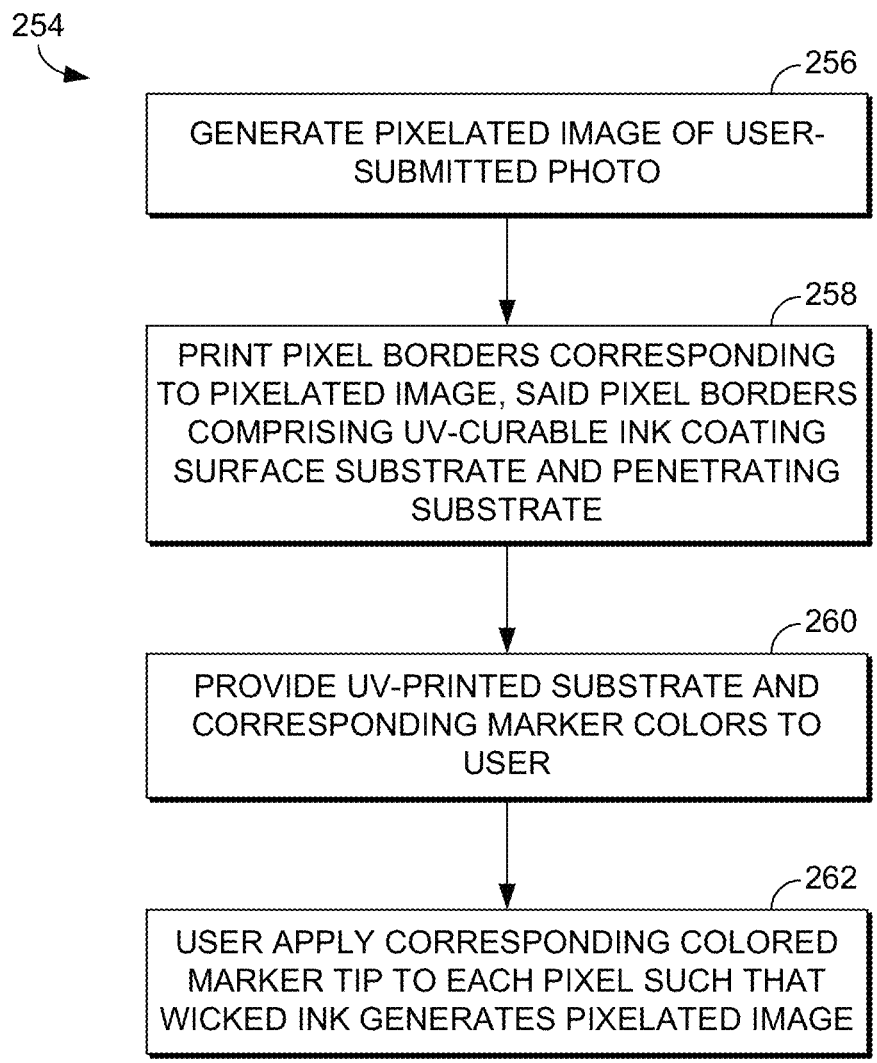
FIG. 27 is a flow diagram of a method for generating a pixel art image based on applying marker ink to a substrate having a pixel-assigned surface, in accordance with an embodiment of the invention.

Referring finally to FIG. 27, a flow diagram of a method 254 for generating a pixel art image based on applying marker ink to a substrate having a pixel-assigned surface is provided in accordance with an embodiment of the invention. At block 256, a pixelated image of a user-submitted photo is generated. In one aspect, a user-submitted image, such as a photo, is processed to generate a pixelated image for pixel-art generation. At block 258, pixel borders corresponding to the pixelated image are printed, with the pixel borders comprising UV-curable ink coating surface substrates that penetrate the substrate. For example, the borders of each pixel may be "printed" using UV-curable ink on a particular surface, such as a specialty paper/fabric. In some embodiments, the ink may not only coat the surface of the substrate, but also soak through to the other side of the substrate.

In further embodiments, curing of the ink under UV light may result in a crosslinking reaction hardening the resins in the ink. The cured ink that is within the matrix of the substrate may then act as a physical barrier for the next steps in this process. At block 260, a UV-printed substrate and corresponding set of marker colors may be provided to a user. Once the user receives the UV-printed substrate, along with the corresponding colors of markers or other ink-applying mechanism, a user may apply a corresponding colored marker tip to each pixel such that the ink is wicked and generates the pixelated image, at block 262. For example, a marking instrument containing a water-based ink may be matched to the color of each pixel. A user may then hold the tip of the marker adjacent the pixel to allow the ink to flow into the substrate, flowing and/or spreading via wicking into the substrate. IN some aspects, the UV-printed lines/pixel borders physically prevent the ink from spreading beyond into surrounding pixels Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A pixel art crayon array apparatus comprising:
  an assembly grid comprising:
    (1) a modular tray body;
    (2) a plurality of apertures configured to receive at least a portion of a crayon body, said plurality of apertures arranged in a particular orientation with respect to the modular tray body; and
    (3) a plurality of peg structures adjacent the plurality of apertures, said plurality of peg structures configured to support one or more cylindrical crayon bodies; and
  a pixelated image template comprising a plurality of color pixel assignments corresponding to the plurality of apertures of the assembly grid and a plurality of crayons.

2. The pixel art crayon photo array of claim 1, wherein the plurality of crayons corresponding to the plurality of color pixel assignments comprises:
  a first color grouping of crayons of the plurality of crayons corresponding to a first assigned numerical value on the pixelated image template, and
  a second color grouping of crayons of the plurality of crayons corresponding with a second assigned numerical value on the pixelated image template.

3. The pixel art crayon photo array of claim 1, wherein the plurality of apertures comprises one or more cylindrical openings, wherein the one or more cylindrical openings are configured to receive one or more cylindrical crayon bodies having a diameter that is less than a diameter of the one or more cylindrical openings.

4. The pixel art crayon photo array of claim 1, wherein the particular orientation comprises a staggered orientation.

5. The pixel art crayon photo array of claim 1, wherein at least one of the plurality of peg structures comprises a triangular structure.

6. The pixel art crayon photo array of claim 1, wherein at least a portion of the modular tray body comprises a transparent grid structure.

7. A pixel art end plug array apparatus comprising:
a plurality of assembly grids, each of the plurality of assembly grids comprising:
(1) a planar grid base;
(2) a plurality of pegs arranged in a staggered orientation with respect to a top surface of the planar grid base; and
(3) at least one connecting portion configured to couple each of the plurality of assembly grids to an adjacent assembly grid; and
an end plug pixel template corresponding to a plurality of end plug colors and a plurality of positions of the plurality of pegs in the staggered orientation.

8. The pixel art end plug array apparatus of claim 7, wherein the end plug pixel template corresponds to a user-submitted image having a plurality of pixel-assigned colors, each of the pixel-assigned colors associated with one of the plurality of end plug colors.

9. A pixel art array kit comprising:
an assembly grid;
a pixel color assignment image corresponding to a user image; and
a plurality of coloring elements corresponding to the pixel color assignment image,
wherein the assembly grid is configured to secure the plurality of coloring elements in an orientation corresponding to the pixel color assignment image, and wherein the plurality of coloring elements comprises a plurality of crayons, and further wherein the assembly grid comprises a crayon assembly grid, said crayon assembly grid comprising:
a plurality of apertures oriented in a plurality of positions with respect to the assembly grid, each of the plurality of apertures comprising a tapered interior configured to secure at least a portion of a tapered crayon body; and
a plurality of triangular pegs adjacent the plurality of apertures, said plurality of triangular pegs configured to secure at least a portion of a crayon body in a vertical orientation with respect to the assembly grid.

10. The pixel art array kit of claim 9, wherein the assembly grid comprises an end plug assembly grid, and further wherein the plurality of coloring elements comprises a plurality of peg structures configured to couple to the end plug assembly grid.

11. The pixel art array kit of claim 9, wherein the assembly grid comprises a first aperture corresponding to a first color pixel assignment and a second aperture corresponding to a second color pixel assignment, said first color pixel assignment different than said second color pixel assignment.

12. The pixel art array kit of claim 11, wherein the plurality of apertures oriented in a plurality of positions comprises a staggered orientation of each aperture in a first column with respect to each aperture in a second column.

13. The pixel art array kit of claim 12, wherein each of the plurality of apertures in the staggered orientation comprises a spacing configured to receive an attachment portion between each of the plurality of crayon bodies, wherein upon receiving a crayon body in each aperture of the assembly grid and receiving an attachment portion between each of the plurality of crayon bodies, a plurality of adhered crayon bodies are configured to be removed from the assembly grid.

14. The pixel art array kit of claim 13, wherein a pixel color assignment image comprises a first template portion associated with a first portion of the user image and a second template portion associated with a second portion of the user image, said first image and said second image corresponding to a first adhered crayon body portion and a second adhered crayon body portion of an assembled pixel art array.

15. The pixel art array kit of claim 9, wherein the assembly grid comprises a treated substrate, said treated substrate comprising a pixel-assigned surface.

16. The pixel art array kit of claim 15, wherein the pixel-assigned surface of the treated substrate is generated in response to a pixelated user image.

17. The pixel art array kit of claim 16, wherein each pixel of the pixel-assigned surface comprises a curable feature configured to provide a barrier below at least a portion of a surface of the substrate.

18. The pixel art array kit of claim 16, wherein each pixel of the pixel-assigned surface corresponds to an ink color associated with a marking device.

19. The pixel art array kit of claim 18, wherein the pixel art array kit comprises a plurality of marking devices for applying a plurality of ink colors to the pixel-assigned surface of the substrate such that a wicking property of the substrate provides an image corresponding to the user image.

* * * * *